United States Patent
Liu et al.

(10) Patent No.: US 10,862,581 B2
(45) Date of Patent: Dec. 8, 2020

(54) DYNAMIC TIME DIVISION DUPLEX (TDD) FRAME STRUCTURE FOR HOPPING SUPERFRAMES

(71) Applicant: QUALCOMM Incorporated, San Diego, CA (US)

(72) Inventors: Chih-Hao Liu, San Diego, CA (US); Srinivas Yerramalli, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 37 days.

(21) Appl. No.: 16/258,454

(22) Filed: Jan. 25, 2019

(65) Prior Publication Data
US 2019/0238219 A1    Aug. 1, 2019

Related U.S. Application Data

(60) Provisional application No. 62/624,087, filed on Jan. 30, 2018.

(51) Int. Cl.
*H04B 7/26* (2006.01)
*H04L 5/14* (2006.01)
(Continued)

(52) U.S. Cl.
CPC ........... *H04B 7/2656* (2013.01); *H04B 1/713* (2013.01); *H04L 5/00* (2013.01); *H04L 5/0012* (2013.01);
(Continued)

(58) Field of Classification Search
CPC ... H04W 88/10; H04W 74/0808; H04W 4/70; H04W 48/16; H04W 16/14;
(Continued)

(56) References Cited

U.S. PATENT DOCUMENTS

2018/0020452 A1    1/2018  Yerramalli et al.
2018/0287845 A1*  10/2018  Kim .................... H04L 27/2666
(Continued)

FOREIGN PATENT DOCUMENTS

GB    2493986 B    3/2014

OTHER PUBLICATIONS

International Search Report and Written Opinion—PCT/US2019/015438—ISA/EPO—dated Apr. 12, 2019.
Lenovo: "On NB-IoT Anchor Carrier,"3GPP Draft; R1-160121, 3rd Generation Partnership Project (3GPP), Mobile Competence Centre; 650, Route Des Lucioles; F-06921 Sophia-Antipolis Cedex; France, vol. RAN WG1, No. Budapest, HU; Jan. 18, 2016-Jan. 20, 2016, Jan. 12, 2016, XP051064733, 4 pages, Retrieved from the Internet: URL: http://www.3gpp.org/ftp/tsg_ran/WG1_RL1/TSGR1_AH/LTE_NB-IoT_1601/Docs/ [retrieved on Jan. 12, 2016].
(Continued)

Primary Examiner — Jung Liu
(74) Attorney, Agent, or Firm — Loza & Loza, LLP

(57) ABSTRACT

Aspects of the disclosure relate to a dynamic, configurable time division duplex (TDD) frame structure for hopping superframes utilized in narrowband Internet of Things (NB-IOT) wireless communication systems. The configurable frame structure includes an anchor segment residing on a plurality of anchor hopping frequencies and a data segment residing on one of a plurality of non-anchor hopping frequencies. The data segment includes a downlink portion, an uplink portion, and a configurable portion between the downlink control portion and the uplink control portion that may be configured to include at least one of downlink information or uplink information.

30 Claims, 17 Drawing Sheets

(51) Int. Cl.
    *H04W 72/12*     (2009.01)
    *H04W 72/04*     (2009.01)
    *H04L 5/00*     (2006.01)
    *H04B 1/713*     (2011.01)
    *H04W 4/70*     (2018.01)
    *H04W 16/14*     (2009.01)

(52) U.S. Cl.
    CPC ............... *H04L 5/14* (2013.01); *H04W 4/70* (2018.02); *H04W 72/042* (2013.01); *H04W 72/1215* (2013.01); *H04W 16/14* (2013.01)

(58) Field of Classification Search
    CPC ......... H04W 72/0406; H04W 74/0841; H04W 72/042; H04L 5/0051; H04L 27/2662; H04L 5/005; H04L 27/2666; H04L 1/1812; H04L 5/001; H04L 5/0044; H04L 5/0053; H04L 5/0048; H04B 1/713; H04J 11/0073
    See application file for complete search history.

(56) References Cited

U.S. PATENT DOCUMENTS

2019/0254015 A1*   8/2019   Chang ............... H04W 72/0446
2020/0029392 A1*   1/2020   Ye ........................ H04W 48/16

OTHER PUBLICATIONS

NOKIA Networks: "On the TDD Support for NB-IoT," 3GPP Draft; R1-160011, 3rd Generation Partnership Project (3GPP), Mobile Competence Centre; 650, Route Des Lucioles; F-06921 Sophia-Antipolis Cedex; France, vol. RAN WG1, No. Budapest, HU; Jan. 17, 2016, XP051053334, Retrieved from the Internet: URL: http://www.3gpp.org/ftp/Meetings_3GPP_SYNC/RAN1/Docs/ [retrieved on Jan. 17, 2016].

Sharp: "On Non-Anchor PRBs for NB-IoT Multi-Carrier Operation", 3GPP Draft; R1-162835, 3rd Generation Partnership Project (3GPP), Mobile Competence Centre, 650, Route Des Lucioles; F-06921 Sophia-Antipolis Cedex, France, vol. RAN WG1, No. Busan, Korea; Apr. 11, 2016-Apr. 15, 2016, Apr. 6, 2016 (Apr. 6, 2016), pp. 1-5, XP051080727, Retrieved from the Internet: URL: http://www.3gpp.org/ftp/tsg_ran/WG1_RL1/TSGR1_84b/Docs/ [retrieved on Apr. 6, 2016].

Zte: "PRB Group Definition and Frequency Hopping for MTC Enhancement," 3GPP Draft; R1-152954_PRBGROUP_HOPPING, 3rd Generation Partnership Project (3GPP), Mobile Competence Centre; 650, Route Des Lucioles; F-06921 Sophia-Antipolis Cedex; France, vol. RAN WG1, No. Fukuoka, Japan; May 25, 2015-May 29, 2015, May 15, 2015, XP050969461, 6 pages, Retrieved from the Internet: URL: http://www.3gpp.org/ftp/tsg_ran/WG1_RL1/TSGR1_81/Docs/ [retrieved on May 15, 2015].

* cited by examiner

DYNAMIC TIME DIVISION DUPLEX (TDD) FRAME STRUCTURE FOR HOPPING SUPERFRAMES

PRIORITY CLAIM

This application claims priority to and the benefit of Provisional Patent Application No. 62/624,087 filed in the U.S. Patent and Trademark Office on Jan. 30, 2018, the entire contents of which are incorporated herein by reference as if fully set forth below in their entirety and for all applicable purposes.

TECHNICAL FIELD

The technology discussed below relates generally to wireless communication systems, and more particularly, to dynamic time division duplex (TDD) frame structures for use in wireless communication systems.

INTRODUCTION

Narrowband Internet of Things (NB-IOT) networks are based on a low power wide area network (LPWAN) technology that enables a wide range of IoT devices, such as smart meters, home appliances, wearables, and other devices embedded with network connectivity, to communicate, for example, in unused 200 kHz bands. As the demand for NB-IOT networks continues to increase, research and development continue to advance wireless communication technologies to meet this demand.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the disclosure relate to a configurable time division duplex (TDD) frame structure for hopping superframes utilized in narrowband Internet of Things (NB-IOT) wireless communication systems. The configurable frame structure includes an anchor segment residing on a plurality of anchor hopping frequencies and a data segment residing on one of a plurality of non-anchor hopping frequencies. The data segment includes a downlink portion, an uplink portion, and a configurable portion between the downlink control portion and the uplink control portion that may be configured to include at least one of downlink information or uplink information.

In one example, a method of wireless communication in a wireless communication network for a scheduling entity to communicate with a set of one or more scheduled entities is disclosed. The method includes providing a frame structure including a plurality of time division duplex (TDD) carriers, each of the plurality of TDD carriers corresponding to one of a plurality of hopping frequencies, where the plurality of hopping frequencies include a plurality of anchor hopping frequencies and a plurality of non-anchor hopping frequencies. The frame structure includes an anchor segment residing on the plurality of anchor hopping frequencies and a data segment residing on at least one of the plurality of non-anchor hopping frequencies. The data segment includes a downlink portion, an uplink portion, and a configurable portion between the downlink portion and the uplink portion. The method further includes configuring the configurable portion of the frame structure to include at least one of downlink information or uplink information to produce a current hopping superframe of a plurality of hopping superframes, and communicating between the scheduling entity and the set of one or more scheduled entities using the current hopping superframe.

Another example discloses a scheduling entity in a wireless communication network. The scheduling entity includes a processor, a memory communicatively coupled to the processor, and a transceiver communicatively coupled to the processor. The transceiver is configured to wirelessly communicate with a set of one or more scheduled entities over a plurality of time division duplex (TDD) carriers, each of the plurality of TDD carriers corresponding to one of a plurality of hopping frequencies, where the plurality of hopping frequencies include a plurality of anchor hopping frequencies and a plurality of non-anchor hopping frequencies. The memory maintains a frame structure that includes an anchor segment configured to reside on the plurality of anchor hopping frequencies and a data segment configured to reside on at least one of the plurality of non-anchor hopping frequencies. The data segment includes a downlink portion, an uplink portion, and a configurable portion between the downlink portion and the uplink portion. The processor is configured to configure the configurable portion of the frame structure to include at least one of downlink information or uplink information to produce a current hopping superframe of a plurality of hopping superframes, and communicate between the scheduling entity and the set of one or more scheduled entities using the current hopping superframe via the transceiver.

Another example discloses a method of wireless communication in a wireless communication network for a scheduled entity to communicate with a scheduling entity. The method includes receiving frame structure information indicating a frame structure of a current hopping superframe. The frame structure includes an anchor segment residing on a plurality of anchor hopping frequencies and a data segment residing on one of a plurality of non-anchor hopping frequencies, in which each of the anchor hopping frequencies and the non-anchor hopping frequencies corresponds to one of a plurality of time division duplex (TDD) carriers. The data segment includes a downlink portion, an uplink portion, and a configurable portion between the downlink portion and the uplink portion. The method further includes determining whether the configurable portion of the frame structure for the current hopping superframe includes at least one of downlink information or uplink information based on the frame structure information, and communicating between the scheduled entity and the scheduling entity using the current hopping superframe.

Another example discloses a scheduled entity in a wireless communication network. The scheduled entity includes a processor, a memory communicatively coupled to the processor, and a transceiver communicatively coupled to the processor. The transceiver is configured to wirelessly communicate with a scheduling entity over a plurality of time division duplex (TDD) carriers, each of the plurality of TDD carriers corresponding to one of a plurality of hopping frequencies. The processor is configured to receive frame structure information indicating a frame structure of a current hopping superframe. The frame structure includes an anchor segment residing on a plurality of anchor hopping frequencies and a data segment residing on one of a plurality of non-anchor hopping frequencies. The data segment includes a downlink portion, an uplink portion, and a configurable portion between the downlink portion and the uplink portion. The processor is further configured to determine whether the configurable portion of the frame structure for the current hopping superframe includes at least one of downlink information or uplink information based on the frame structure information, and communicate between the scheduled entity and the scheduling entity using the current hopping superframe.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
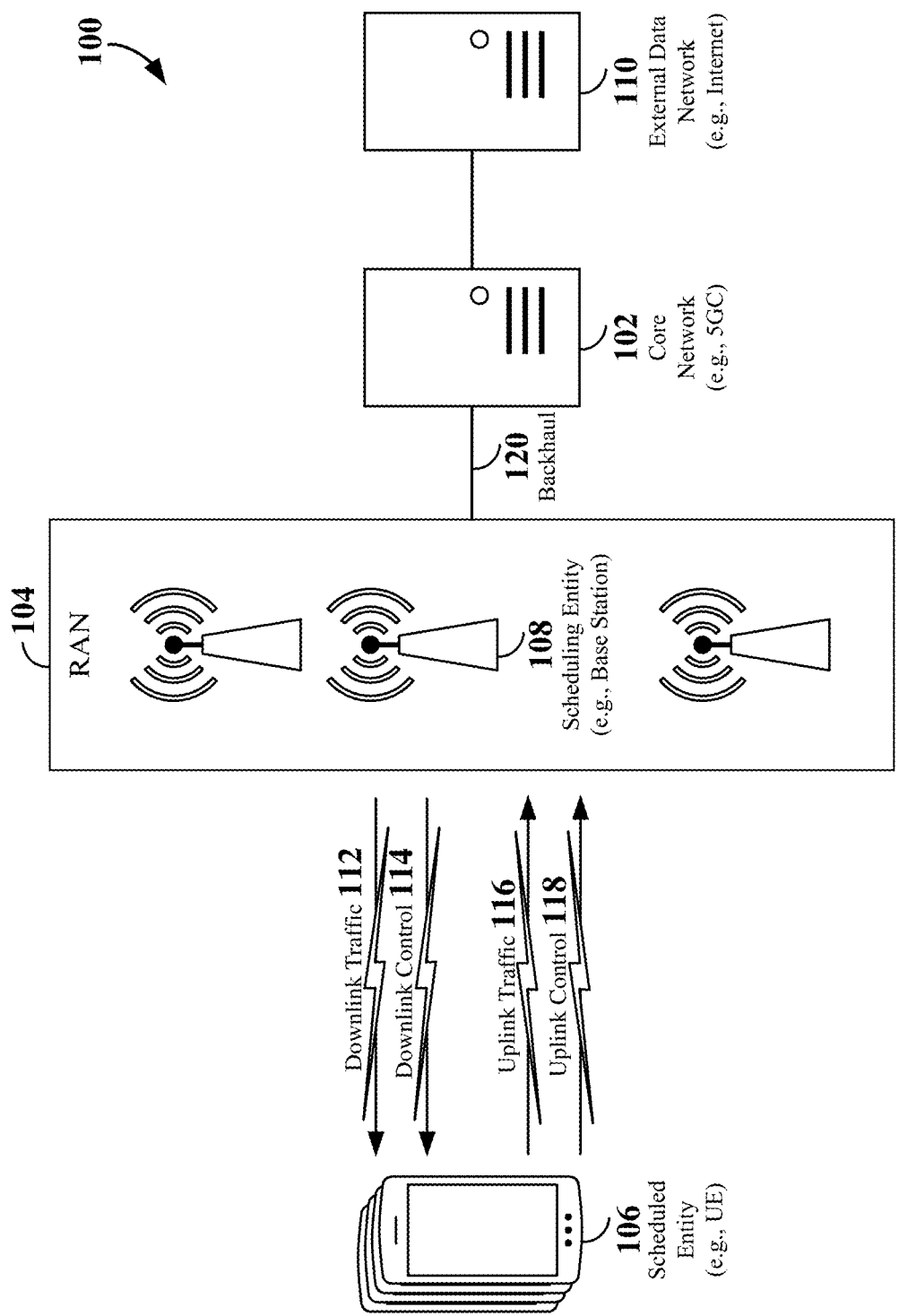
FIG. 1 is a schematic illustration of a wireless communication system.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
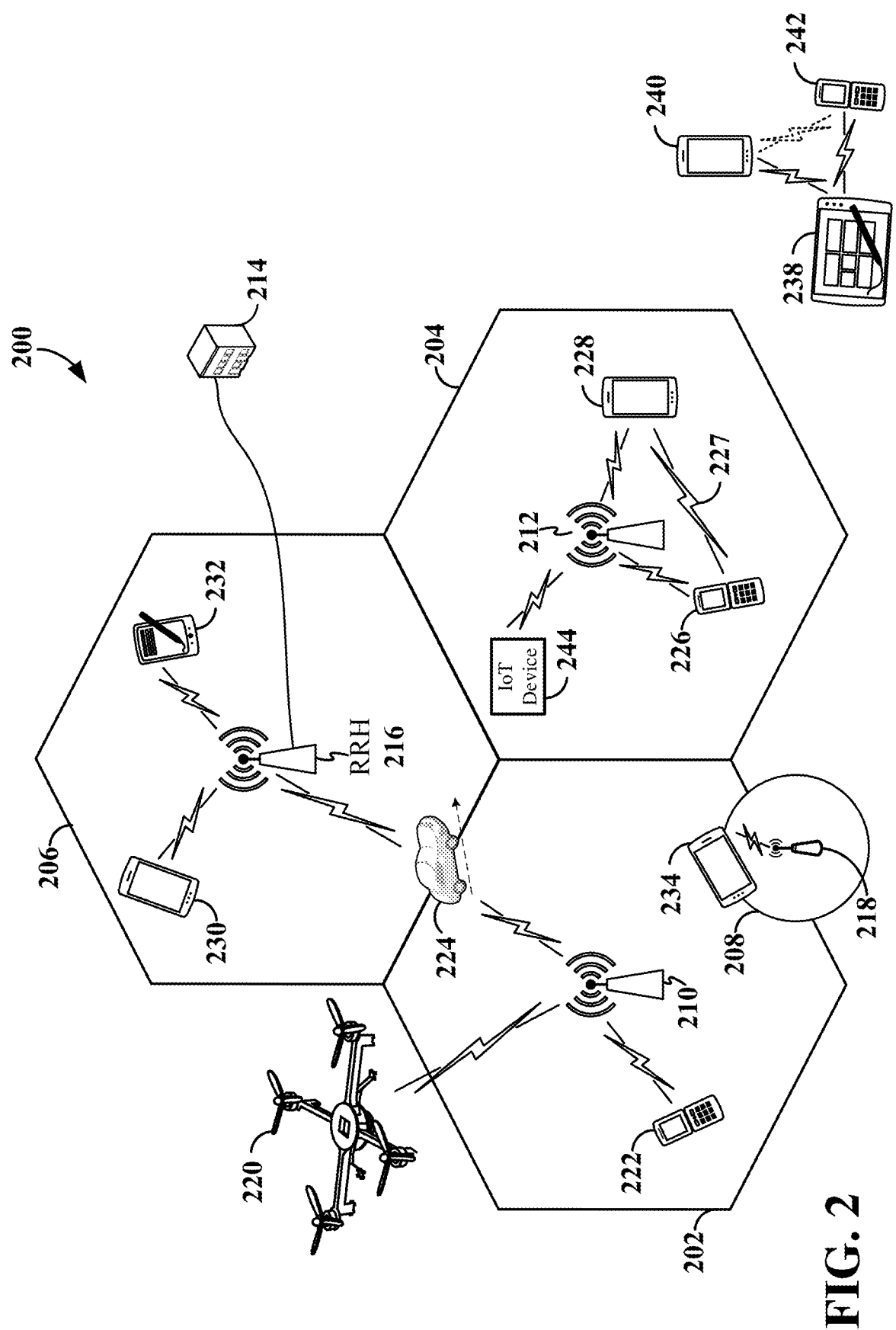
FIG. 2 is a conceptual illustration of an example of a radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 238, 240, and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210.

In some examples, an Internet of Things (IoT) device 244 may be configured to function as a UE. Examples of IoT devices may include, but are not limited to, a remote sensor or actuator, a robot or robotics device, an object/person/animal tracking device, a remote control device, a consumer and/or wearable device, a digital home or smart home device, a municipal infrastructure device, an industrial automation and enterprise device, a logistics controller, agricultural equipment, military defense equipment, a telehealth device, or other device including embedded network connectivity technology. For example, the IoT device may operate within cell 204 by communicating with base station 212.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In some examples, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In some examples, TDD may be utilized within a narrowband Internet of Things (NB-IoT) network in which a base station, such as base station 212, may be configured to operate as a NB-IoT base station to serve a plurality of IoT devices, such as IoT device 244. In some examples, the base station 212 may utilize a plurality of unused narrowband frequencies (e.g., 200 kHz carriers) to communicate with the IoT device 244. The unused narrowband frequencies may include, for example, unlicensed frequencies or licensed frequencies designated for NB-IoT (e.g., new bandwidth, bandwidth reserved within the guard band of an existing LTE network, or a resource block reserved in a carrier of an existing network).

An example of unlicensed frequencies includes the 902-926 MHz unlicensed band. In this example, the unlicensed band may be divided into 200 kHz carriers and frequency hopping may be utilized by the base station 212 to communicate with a plurality of IoT devices within a cell (e.g., cell 204). To maximize the number of hopping channels available for downlink and uplink transmissions, the unlicensed band may utilize TDD to transmit uplink and downlink information.

In some examples, the unlicensed band may be time-divided into a plurality of superframes, each including a plurality of downlink and/or uplink subframes. As used herein, the term "superframe" refers to a transmission duration that corresponds to a number of subframes that exceeds the number of subframes included within a frame. For example, a superframe may include 160 subframes or 320 subframes to enable multiple repetitions of downlink and/or uplink traffic for error correction. A fixed allocation of downlink and uplink subframes within a superframe may result in wasted resources if long repetitions are required for a single transmission or if the traffic varies between uplink and downlink frequently. Therefore, various aspects of the present disclosure provide a dynamic (configurable) TDD frame structure that may be utilized for hopping superframes in NB-IoT networks.

It should be understood that the configurable TDD frame structure may also be utilized in connection with existing or emerging networks (e.g., LTE and NR). In addition, the configurable TDD frame structure may also be utilized on a smaller-scale to produce configurable radio frames, subframes and/or slots.

Figure 3:
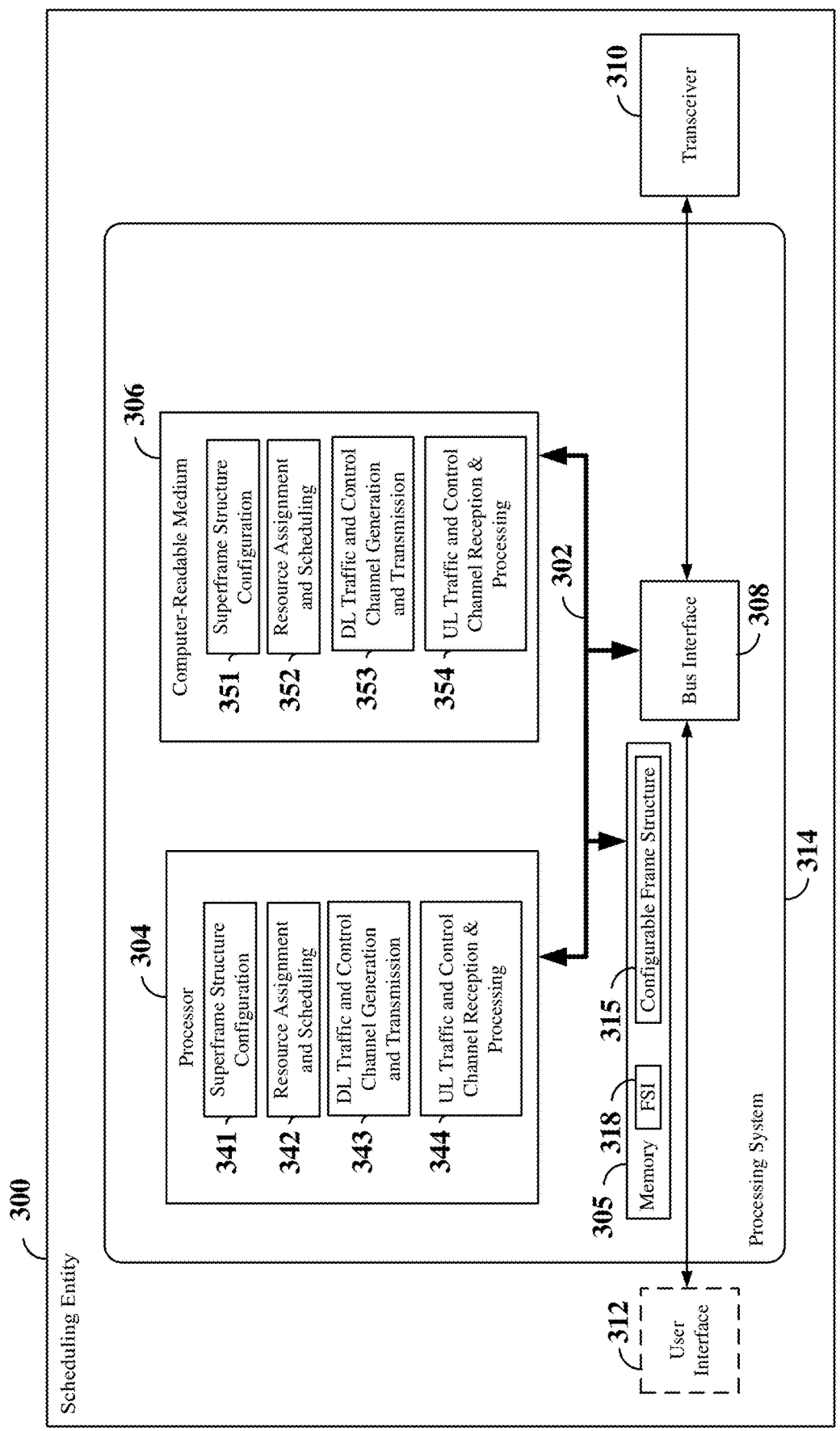
FIG. 3 is a block diagram conceptually illustrating an example of a hardware implementation for a scheduling entity.

FIG. 3 is a block diagram illustrating an example of a hardware implementation for a scheduling entity 300 employing a processing system 314. For example, the scheduling entity 300 may be a user equipment (UE) as illustrated in any one or more more of FIGS. 1 and/or 2. In another example, the scheduling entity 300 may be a base station as illustrated in any one or more of FIGS. 1 and/or 2.

The scheduling entity 300 may be implemented with a processing system 314 that includes one or more processors 304. Examples of processors 304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 300 may be configured to perform any one or more of the functions described herein. That is, the processor 304, as utilized in a scheduling entity 300, may be used to implement any one or more of the processes and procedures described below.

In this example, the processing system 314 may be implemented with a bus architecture, represented generally by the bus 302. The bus 302 may include any number of interconnecting buses and bridges depending on the specific application of the processing system 314 and the overall design constraints. The bus 302 communicatively couples together various circuits including one or more processors (represented generally by the processor 304), a memory 305, and computer-readable media (represented generally by the computer-readable medium 306). The bus 302 may also link various other circuits such as timing sources, peripherals, voltage regulators, and power management circuits, which are well known in the art, and therefore, will not be described any further. A bus interface 308 provides an interface between the bus 302 and a transceiver 310. The transceiver 310 provides a communication interface or means for communicating with various other apparatus over a transmission medium. Depending upon the nature of the apparatus, a user interface 312 (e.g., keypad, display, speaker, microphone, joystick) may also be provided. Of course, such a user interface 312 is optional, and may be omitted in some examples, such as a base station.

The processor 304 is responsible for managing the bus 302 and general processing, including the execution of software stored on the computer-readable medium 306. One or more processors 304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software, when executed by the processor 304, causes the processing system 314 to perform the various functions described below for any particular apparatus. The computer-readable medium 306 and the memory 305 may also be used for storing data that is manipulated by the processor 304 when executing software.

The computer-readable medium 306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 306 may reside in the processing system 314, external to the processing system 314, or distributed across multiple entities including the processing system 314. The computer-readable medium 306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 304 may include circuitry configured for various functions. For example, the processor 304 may include superframe structure configuration circuitry 341, configured to produce a current hopping superframe for use in communicating between the scheduling entity and a set of one or more scheduled entities (e.g., IoT devices). The superframe structure configuration circuitry 341 may utilize a configurable frame structure 315 maintained, for example, in memory 305, to produce the current hopping superframe.

In some examples, the configurable frame structure 315 includes an anchor segment and a data segment. The anchor segment may be configured to reside on a plurality of anchor hopping frequencies, whereas the data segment may be configured to reside on a plurality of non-anchor hopping frequencies. In some examples, the non-anchor hopping frequencies are each different from any of the anchor hopping frequencies (i.e., there is no overlap between the anchor hopping frequencies and the non-anchor hopping frequencies). Each of the anchor and non-anchor hopping frequencies may correspond to a respective time division duplex (TDD) carrier. In some examples, each of the TDD carriers is a narrowband (e.g., 200 kHz) carrier.

The anchor segment may be utilized to transmit, for example, initial synchronization information that may be utilized by a scheduled entity to synchronize with the network. For example, the initial synchronization information may be transmitted within a narrowband Primary Synchronization Signal (NPSS), narrowband Secondary Synchronization Signal (NSSS), narrowband Physical Broadcast Channel (NPBCH), and/or a narrowband Reference Signal (NRS).

The data segment may be utilized to transmit, for example, downlink control information, downlink traffic, uplink control information, and uplink traffic. For example, the downlink control information may be transmitted within a narrowband Physical Downlink Control Channel (NPDCCH), which may include downlink control information (DCI) carrying a downlink assignment or uplink grant. The downlink traffic may be transmitted within a narrowband Physical Downlink Shared Channel (NPDSCH). The uplink control information and uplink traffic may be transmitted, for example, within a narrowband Physical Uplink Shared Channel (NPUSCH). In some examples, the NPUSCH may include two formats. Format 1 may be used for carrying uplink traffic, whereas Format 2 may be used for carrying HARQ acknowledgement information for the NDPSCH (e.g., ACK/NACK). In some examples, Format 1 may support multi-tone transmission, while Format 2 may support single-tone transmission based on either 15 kHz or 3.75 kHz numerology.

In some examples, the data segment may include a guaranteed downlink portion, a guaranteed uplink portion, and a configurable portion between the downlink portion and the uplink portion that may be configured to include downlink information (e.g., one or more downlink subframes) or uplink information (e.g., one or more uplink subframes). In examples in which the configurable frame structure 315 may be utilized to produce a single frame, subframe, or slot, the downlink information may include one or more downlink symbols and the uplink information may include one or more uplink symbols. In some examples, the data segment may include two or more downlink portions, two or more uplink portions and two or more configurable portions, depending on the subframe length and desired configuration.

In some examples, the guaranteed downlink portion may be utilized to transmit a NPDCCH. In addition, the guaranteed uplink portion may be utilized to transmit a NPUSCH (Format 1 or Format 2). The configurable portion may be utilized to transmit a NPDSCH when configured to include downlink information and/or a NPUSCH when configured to include uplink information.

In some examples, the superframe structure configuration circuitry 341 may be configured to dynamically configure the current hopping superframe based on one or more factors (e.g., the type of traffic (uplink or downlink) waiting to be transmitted, expected number of repetitions, QoS for one or more scheduled entities, etc.). The superframe structure configuration circuitry 341 may further be configured to generate frame structure information (FSI) 318 indicating whether the configurable portion of the current hopping superframe includes downlink information or uplink information and include the FSI 318 within the guaranteed downlink portion (e.g., within the DCI of the NPDCCH) of the current hopping superframe. In addition, the FSI 318 may indicate whether the guaranteed uplink portion of the data segment includes NPUCCH, Format 1 or Format 2.

In other examples, the FSI 318 may be preconfigured (e.g., by a higher layer) for a number of superframes and stored, for example, within the memory 305. The superframe structure configuration circuitry 341 may access the FSI 318 stored within the memory 305 and configure the configurable portion of the current hopping superframe utilizing the FSI 318. Thus, in this example, the FSI 318 may indicate a fixed frame structure for the configurable portion of the current hopping superframe. In some examples, the fixed frame structure may be signaled to one or more scheduled entities via radio resource control (RRC) signaling.

In some examples, the superframe structure configuration circuitry 341 may further be configured to aggregate a transmission duration of the current hopping superframe over the plurality of non-anchor hopping frequencies to produce an aggregated transmission duration, identify a duty cycle associated with downlink transmissions in one of the non-anchor hopping frequencies, and calculate a downlink transmission percentage for the current hopping superframe based on the aggregated transmission duration and the duty cycle. The superframe structure configuration circuitry 341 may then be configured to configure the configurable portion of the frame structure to produce the current hopping superframe with the downlink transmission percentage (e.g., the guaranteed downlink portion in combination with the configured downlink portion equals the allowed downlink transmission percentage). Such a configuration may be beneficial in networks with stringent duty cycle constraints. For example, in the European Union (EU) band of 865.6 to 867.6 MHz, four 200 kHz carriers are available and the duty cycle constraints are 10% per carrier for the scheduling entity and 2.5% per carrier for the scheduled entity.

In some examples, the superframe structure configuration circuitry 341 may further be configured to aggregate the transmission duration over the plurality of non-anchor hopping frequencies in different bands to aggregate the duty cycle, thereby increasing the downlink transmission percentage in the current hopping superframe. The scheduling entity may then utilize the current superframe so configured by the superframe structure configuration circuitry 341 to hop among the different non-anchor hopping frequencies in the different bands. The superframe structure configuration circuitry 341 may further be configured to execute superframe structure configuration software 351 on the computer-readable medium 306 to implement one or more of the functions described herein.

The processor 304 may further include resource assignment and scheduling circuitry 342, configured to generate, schedule, and modify a resource assignment or grant of time-frequency resources (e.g., a set of one or more resource elements). For example, the resource assignment and scheduling circuitry 342 may schedule time-frequency resources within a plurality of time division duplex (TDD) hopping superframes (or one or more radio frames, subframes, and/or slots) to carry traffic and/or control information to and/or from multiple IoT devices (scheduled entities). The resource assignment and scheduling circuitry 342 may further be configured to execute resource assignment and scheduling software 352 on the computer-readable medium 306 to implement one or more of the functions described herein.

The processor 304 may further include downlink (DL) traffic and control channel generation and transmission circuitry 343, configured to generate and transmit downlink traffic and control channels within one or more hopping superframes (or one or more radio frames, subframes and/or slots). The DL traffic and control channel generation and transmission circuitry 343 may operate in coordination with the resource assignment and scheduling circuitry 342 to place the DL traffic and/or control information onto a plurality of narrowband time division duplex (TDD) carriers by including the DL traffic and/or control information within one or more hopping superframes (or one or more radio frames, subframes, and/or slots) in accordance with the resources assigned to the DL traffic and/or control information.

In some examples, the DL traffic and control channel generation and transmission circuitry 343 may place synchronization information (e.g., NPSS, NSSS, NPBCH, and/or NRS) on one or more anchor hopping frequencies within an anchor segment of a current hopping superframe. In addition, the DL traffic and control channel generation and transmission circuitry 343 may place DL control information (e.g., NPDCCH) on one or more non-anchor hopping frequencies within a guaranteed downlink portion of a data segment of the current hopping superframe. The DL traffic and control channel generation and transmission circuitry 343 may further place DL traffic (e.g., NPDSCH) on one or more non-anchor hopping frequencies within a configurable portion of the data segment of the current hopping superframe. The DL traffic and control channel generation and transmission circuitry 343 may be configured to execute DL traffic and control channel generation and transmission software 353 on the computer-readable medium 306 to implement one or more of the functions described herein.

The processor 304 may further include uplink (UL) traffic and control channel reception and processing circuitry 344, configured to receive and process uplink control channels and uplink traffic channels from one or more scheduled entities (e.g., IoT devices). For example, the UL traffic and control channel reception and processing circuitry 344 may be configured to receive uplink traffic from one or more scheduled entities. The UL traffic and control channel reception and processing circuitry 344 may further be configured to receive UL control information from a scheduled entity.

In some examples, the UL traffic and control channel reception and processing circuitry 344 may be configured to receive UL control information (e.g., NPUCCH, Format 2) on one or more non-anchor hopping frequencies within a guaranteed uplink portion of a data segment of the current hopping superframe. The UL traffic and control channel reception and processing circuitry 344 may further receive UL traffic (e.g., NPUCCH, Format 1) on one or more non-anchor hopping frequencies within the guaranteed uplink portion or a configurable portion of the data segment of the current hopping superframe.

In general, the UL traffic and control channel reception and processing circuitry 344 may operate in coordination with the resource assignment and scheduling circuitry 342 to schedule UL traffic transmissions, DL traffic transmissions and/or DL traffic retransmissions in accordance with received UL control information. The UL traffic and control channel reception and processing circuitry 344 may further be configured to execute UL traffic and control channel reception and processing software 354 on the computer-readable medium to implement one or more of the functions described herein.

Figure 4:
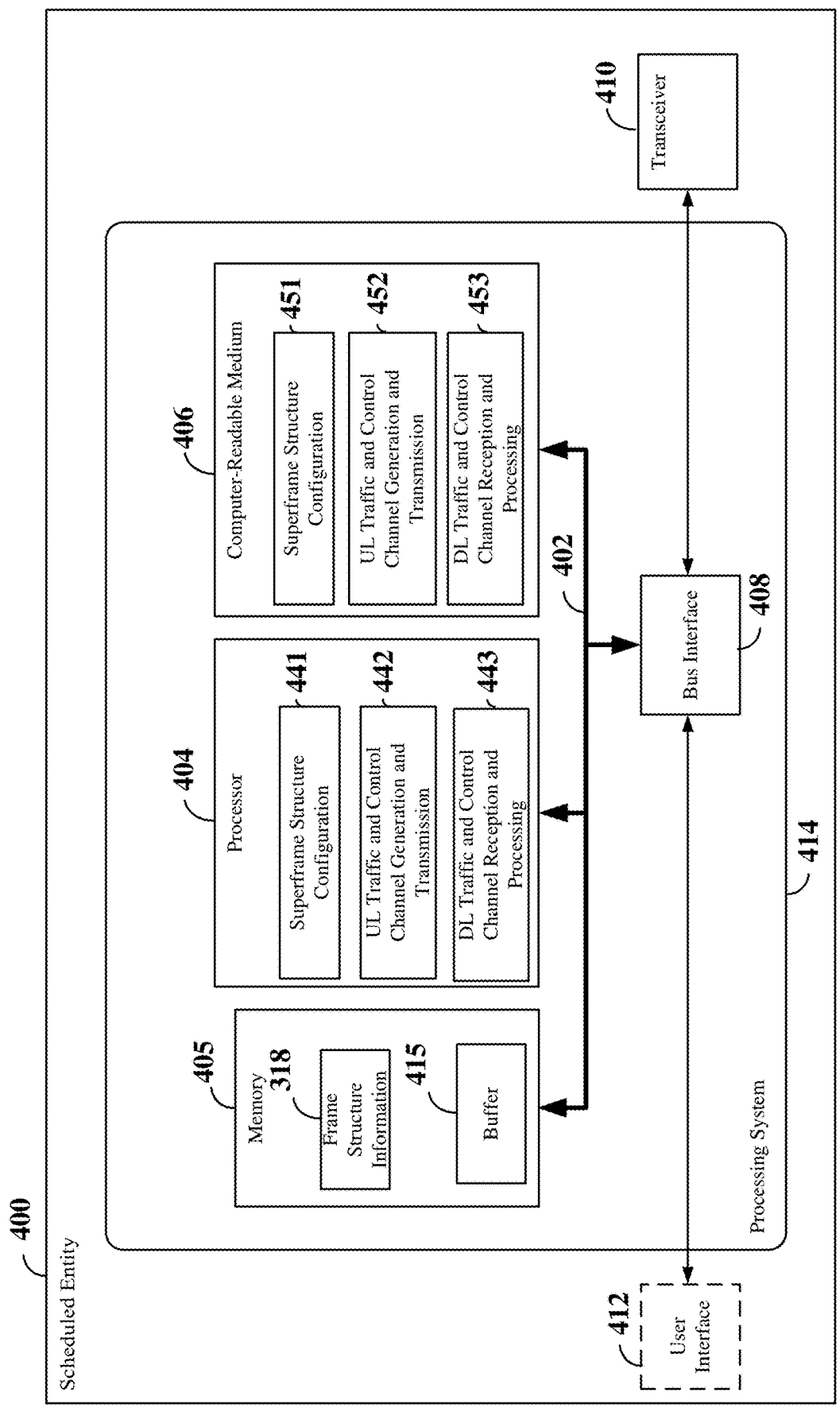
FIG. 4 is a block diagram conceptually illustrating an example of a hardware implementation for a scheduled entity.

FIG. 4 is a conceptual diagram illustrating an example of a hardware implementation for an exemplary scheduled entity 400 employing a processing system 414. In accordance with various aspects of the disclosure, an element, or any portion of an element, or any combination of elements may be implemented with a processing system 414 that includes one or more processors 404. For example, the scheduled entity 400 may be a user equipment (UE), such as an IoT device, as illustrated in any one or more of FIGS. 1 and/or 2.

The processing system 414 may be substantially the same as the processing system 314 illustrated in FIG. 3, including a bus interface 408, a bus 402, memory 405, a processor 404, and a computer-readable medium 406. Furthermore, the first scheduled entity 400 may include a user interface 412 and a transceiver 410 substantially similar to those described above in FIG. 3. That is, the processor 404, as utilized in a first scheduled entity 400, may be used to implement any one or more of the processes described below.

In some aspects of the disclosure, the processor 404 may include superframe structure configuration circuitry 441, configured to receive frame structure information (FSI) 318 from a scheduling entity that indicates a frame structure of a current hopping superframe. The frame structure includes an anchor segment residing on a plurality of anchor hopping frequencies and a data segment residing on one of a plurality of non-anchor hopping frequencies onto which the scheduled entity should hop based on a random hopping sequence. Each of the anchor hopping frequencies and the non-anchor hopping frequencies corresponds to one of a plurality of time division duplex (TDD) narrowband (e.g., 200 kHz) carriers. The data segment includes a guaranteed downlink portion, a guaranteed uplink portion, and a configurable portion between the downlink portion and the uplink portion.

In some examples, the FSI 318 may be received within the DCI of the current hopping superframe. In other examples, the FSI 318 may be received within a control message or via RRC signaling indicating a fixed frame structure within the network. For example, the FSI 318 may indicate that the frame structure is fixed for a plurality of hopping superframes including the current hopping superframe. In some examples, the fixed FSI 318 may be utilized until a new FSI 318 is received. The FSI 318 may be stored, for example, within the memory 405.

The superframe structure configuration circuitry 441 may further be configured to determine whether the configurable portion of the frame structure for the current hopping superframe includes downlink information and/or uplink information based on the FSI 318. In addition, the superframe structure configuration circuitry 441 may further be configured to determine whether the guaranteed uplink portion of the data segment of the current hopping superframe includes NPUCCH, Format 1 or Format 2. The superframe structure configuration circuitry 441 may further be configured to enable communication with the scheduling entity based on the FSI 318. The superframe structure configuration circuitry 441 may be configured to execute superframe structure configuration software 451 on the computer-readable medium 406 to implement one or more of the functions described herein.

The processor 404 may further include uplink (UL) traffic and control channel generation and transmission circuitry 442, configured to generate and transmit uplink control/feedback/acknowledgement information on an UL control channel. For example, the UL traffic and control channel generation and transmission circuitry 442 may be configured to generate and transmit uplink traffic on an UL traffic channel (e.g., a NPUCCH, Format 1) in accordance with an uplink grant. In addition, the UL traffic and control channel generation and transmission circuitry 442 may be configured to generate and transmit uplink control information, such as an ACK/NACK, scheduling request, or uplink sounding reference signal on an UL control channel (e.g., the NPUSCH, Format 2).

In some examples, the UL traffic and control channel generation and transmission circuitry 442 may be configured to place UL control information (e.g., NPUCCH, Format 2) on one or more non-anchor hopping frequencies within a guaranteed uplink portion of a data segment of the current hopping superframe. The UL traffic and control channel generation and transmission circuitry 442 may further operate in coordination with the superframe structure configuration circuitry 441 to place UL traffic (e.g., NPUCCH, Format 1) on one or more non-anchor hopping frequencies within the guaranteed uplink portion or a configurable portion of the data segment of the current hopping superframe based on the FSI 318. The UL traffic and control channel generation and transmission circuitry 442 may be configured to execute UL traffic and control channel generation and transmission software 452 on the computer-readable medium 406 to implement one or more of the functions described herein.

The processor 404 may further include downlink (DL) traffic and control channel reception and processing circuitry 443, configured for receiving and processing downlink traffic on a traffic channel, and to receive and process control information on one or more downlink control channels. For example, the DL traffic and control channel reception and processing circuitry 443 may be configured to receive a narrowband Physical Downlink Control Channel (NPDCCH) and/or a narrowband Physical Downlink Shared Channel (NPDSCH). In some examples, received downlink traffic and/or control information may be temporarily stored in a data buffer 415 within memory 405.

In some examples, the DL traffic and control channel reception and processing circuitry 443 may further be configured to receive DL control information (e.g., NPDCCH) on one or more non-anchor hopping frequencies within a guaranteed downlink portion of a data segment of the current hopping superframe. The DL traffic and control channel reception and processing circuitry 443 may further operate in coordination with the superframe structure configuration circuitry 441 to receive DL traffic (e.g., NPDSCH) on one or more non-anchor hopping frequencies within a configurable portion of the data segment of the current hopping superframe based on the FSI 318. The DL traffic and control channel reception and processing circuitry 443 may further be configured to execute DL traffic and control channel reception and processing software 453 on the computer-readable medium 406 to implement one or more of the functions described herein.

Figure 5:
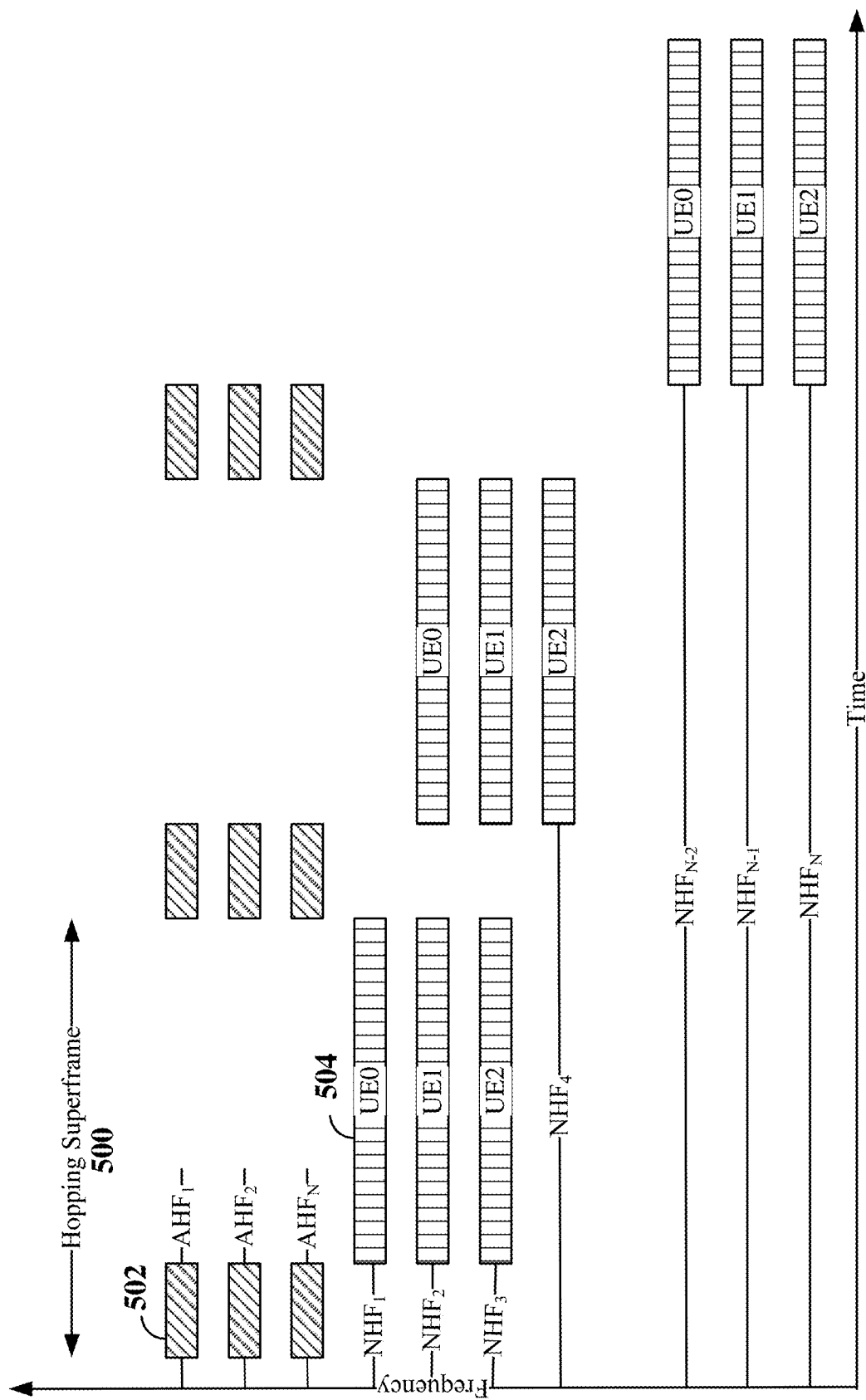
FIG. 5 illustrates an exemplary TDD uplink hopping superframe structure.

FIG. 5 illustrates an example of a time division duplexed (TDD) hopping superframe 500 that may be utilized to communicate between a scheduling entity and one or more scheduled entities (e.g., IoT devices operating as UE's). The scheduling entity may correspond to the scheduling entity 300 shown in FIG. 3. Each scheduled entity (e.g., each UE) may correspond to the scheduled entity 400 shown in FIG. 4.

The hopping superframe 500 includes an anchor segment 502 and a data segment 504. The anchor segment 502 resides on a plurality of anchor hopping frequencies ($AHF_1$, $AHF_2$, ... $AHF_N$). Each UE (e.g., IoT device) may camp onto one of the anchor hopping frequencies in accordance with a random hopping sequence to synchronize with the network. The data segment 504 resides on a plurality of non-anchor hopping frequencies ($NHF_1$, $NHF_2$, ... $NHF_N$). Each of the anchor hopping frequencies and non-anchor hopping frequencies corresponds to a narrowband (e.g., 200 kHz) TDD carrier.

Each UE (e.g., IoT device) may camp onto one of the non-anchor hopping frequencies in accordance with a random hopping sequence to receive downlink control information and/or traffic and to transmit uplink control information and/or traffic in accordance with the frame structure of the hopping superframe 500. For example, a first IoT device (UE0) may camp onto non-anchor hopping frequency $NHF_1$ within the data segment 504 for the hopping superframe 500, a second IoT device (UE1) may camp onto non-anchor hopping frequency $NHF_2$ within the data segment 504 for the hopping superframe 500, and a third IoT device (UE2) may camp onto non-anchor hopping frequency $NHF_3$ within the data segment 504 for the hopping superframe 500. During the next hopping superframe, UE0 camp onto non-anchor hopping frequency $NHF_2$ within the data segment 504 for the next hopping superframe, UE1 may camp onto non-anchor hopping frequency $NHF_3$ within the data segment 504 for the next hopping superframe, and UE2 may camp onto non-anchor hopping frequency $NHF_4$ within the data segment 504 for the next hopping superframe. Similarly, in a subsequent hopping superframe, UE0 may camp onto non-anchor hopping frequency $NHF_{N-2}$ within the data segment 504 for the subsequent hopping superframe, UE1 may camp onto non-anchor hopping frequency $NHF_{N-1}$ within the data segment 504 for the subsequent hopping superframe, and UE2 may camp onto non-anchor hopping frequency $NHF_N$ within the data segment 504 for the subsequent hopping superframe.

Figure 6:
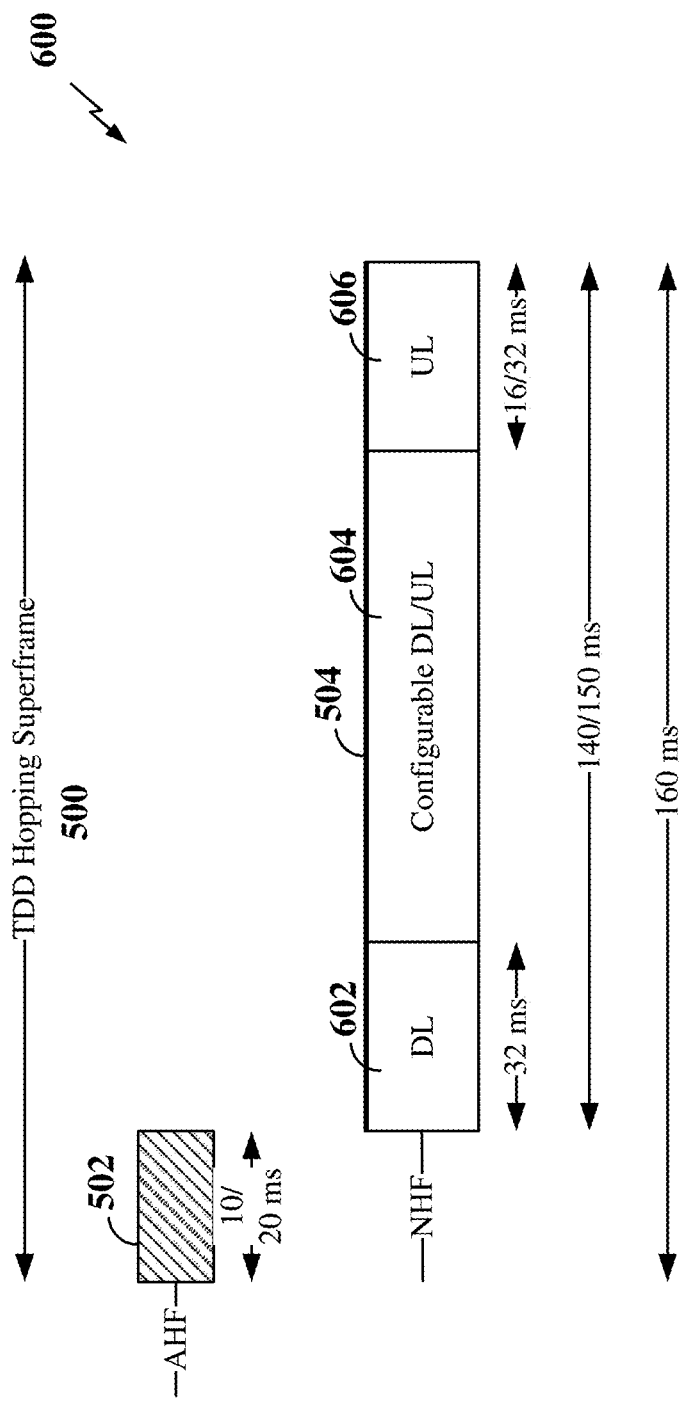
FIG. 6 illustrates an exemplary configurable TDD uplink hopping superframe structure.

FIG. 6 illustrates an example of a configurable frame structure 600 of a TDD hopping superframe 500. Only one anchor hopping frequency (AHF) and one non-anchor hopping frequency (NHF) are shown, for simplicity, to illustrate communication within the hopping superframe 500 between a scheduling entity and a single scheduled entity (e.g., IoT device). The scheduling entity may correspond to the scheduling entity 300 shown in FIG. 3. The scheduled entity (e.g., IoT device operating as a UE) may correspond to the scheduled entity 400 shown in FIG. 4.

The frame structure 600 for the TDD hopping superframe 500 includes the anchor segment 502 residing on the AHF and the data segment 504 residing on the NHF. The anchor segment 502 may have a duration of 10 or 20 ms, corresponding to 10 or 20 subframes, depending on the configuration. The data segment 504 may have a duration of 140 or 150 ms, corresponding to 140 or 150 subframes, depending on the configuration of the anchor segment 502. Thus, the total duration of the TDD hopping superframe 500 may be 160 ms, corresponding to 160 subframes.

The data segment 504 includes a guaranteed downlink (DL) portion 602, a guaranteed uplink (UL) portion 606 and a configurable DL/UL portion 604 between the guaranteed DL portion 602 and guaranteed UL portion 606. The configurable DL/UL portion 604 may be configured to include one or more DL subframes and/or one or more UL subframes, as described above. In some examples, the configurable DL/UL portion 604 may be configured to include only DL subframes or only UL subframes to support multiple repetitions of NPDSCH or NPUCCH, Format 1.

In some examples, for a target maximum coupling loss (MCL) of 150 dB, the NPDCCH may require 32 subframes. In addition, the NPDSCH may require 48 subframes for a payload of 56 bits and 64 subframes for a payload of 88 bits. Similarly, the NPUSCH, Format 2, may require 16 subframes based on 15 kHz numerology or 32 subframes based on 3.75 kHz numerology. In addition, the NPUSCH, Format 1, may require 8 subframes for a payload of 32 bits and 32 subframes for a payload of 328 bits. Thus, in some examples, the guaranteed DL portion 602 may have a duration of 32 ms, corresponding to 32 subframes, while the guaranteed UL portion 606 may have a duration of 16 ms or 32 ms, corresponding to 16 subframes or 32 subframes, respectively, depending on whether the UL portion 606 includes the PUCCH, Format 2 or PUCCH, Format 1. The remaining subframes may be utilized for the configurable DL/UL portion 604.

Figure 7:
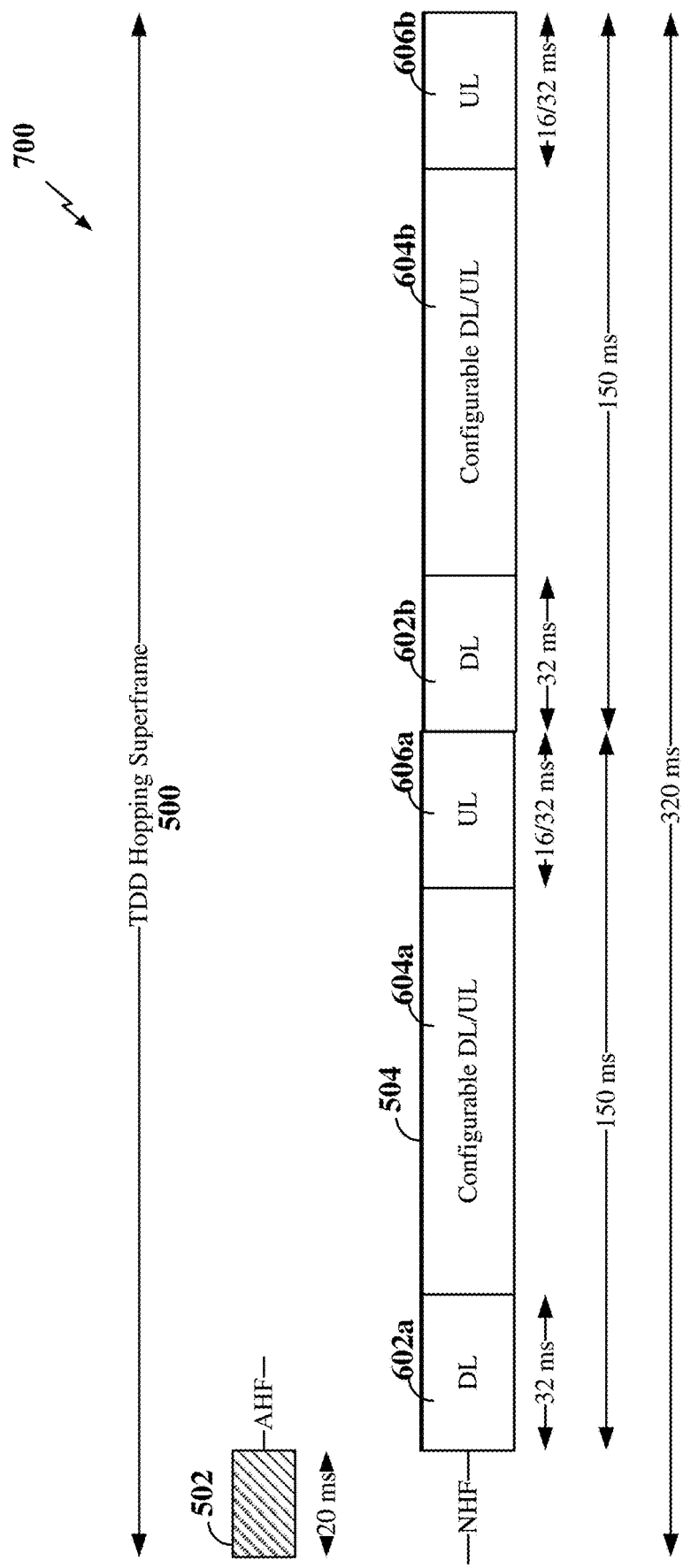
FIG. 7 illustrates another exemplary configurable TDD uplink hopping superframe structure.

FIG. 7 illustrates another example of a configurable frame structure 700 of a TDD hopping superframe 500. Only one anchor hopping frequency (AHF) and one non-anchor hopping frequency (NHF) are shown, for simplicity, to illustrate communication within the hopping superframe 500 between a scheduling entity and a single scheduled entity (e.g., IoT device). The scheduling entity may correspond to the scheduling entity 300 shown in FIG. 3. The scheduled entity (e.g., IoT device operating as a UE) may correspond to the scheduled entity 400 shown in FIG. 4.

The frame structure 700 for the TDD hopping superframe 500 includes the anchor segment 502 residing on the AHF and the data segment 504 residing on the NHF. In the example shown in FIG. 7, the anchor segment 502 has a duration of 20 ms, corresponding to 20 subframes. The data segment 504 has a duration of 300 ms, corresponding to 300 subframes. Thus, the total duration of the TDD hopping superframe 500 may be 320 ms, corresponding to 320 subframes. In addition, each combination of a guaranteed DL portion 602*a/b*, configurable DL/UL portion 604*a/b*, and guaranteed UL portion 606*a/b* has a duration of 150 ms, corresponding to 150 subframes.

The data segment 504 includes two guaranteed downlink (DL) portions 602*a* and 602*b*, two guaranteed uplink (UL) portions 606*a* and 606*b* and two configurable DL/UL portions 604*a* and 604*b*, each between respective ones of the guaranteed DL portions 602*a/b* and guaranteed UL portions 606*a/b*. The configurable DL/UL portions 604*a* and 604*b* may each be separately configured to include one or more DL subframes and/or one or more UL subframes, as described above. In some examples, the configurable DL/UL portion 604*a* may be configured to include only DL subframes, while the configurable DL/UL portion 604*b* may be configured to include only UL subframes.

It should be understood that each configurable DL/UL portion 604*a* and 604*b* may include any number of DL subframes and/or any number of UL subframes within the allocated duration of time. It should further be understood that additional guaranteed downlink portions 602, additional guaranteed uplink portions 606, and/or additional configurable DL/UL portions 604 may also be included. In addition, one of the guaranteed DL portions 602, one of the guaranteed UL portions 606, and/or one of the configurable DL/UL portions 604 may be removed. For example, the first guaranteed UL portion 606*a* and the second guaranteed DL portion 602*b* may be removed, thus providing an extended configurable DL/UL portion 604.

Figure 8:
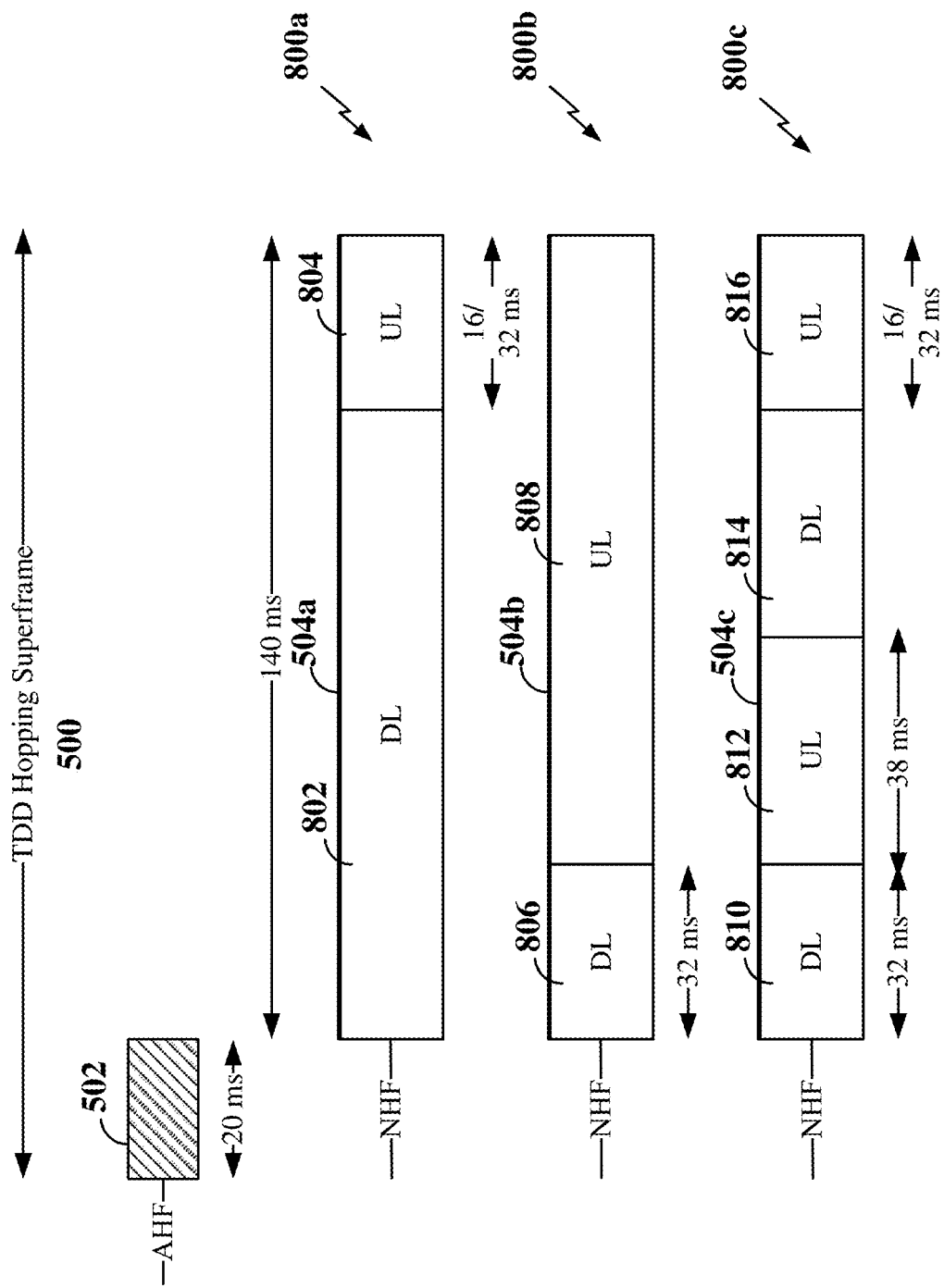
FIG. 8 illustrates examples of configured TDD uplink hopping superframe structures.

FIG. 8 illustrates examples of configured TDD uplink hopping superframe structures 800*a*, 800*b*, and 800*c* that may be preconfigured using the configurable frame structure shown in FIG. 6 and fixed in the network for one or more hopping superframes 500. Only one anchor hopping frequency (AHF) and one non-anchor hopping frequency (NHF) are shown, for simplicity, to illustrate communication within the hopping superframe 500 between a scheduling entity and a single scheduled entity (e.g., IoT device). The scheduling entity may correspond to the scheduling entity 300 shown in FIG. 3. The scheduled entity (e.g., IoT device operating as a UE) may correspond to the scheduled entity 400 shown in FIG. 4.

Each frame structure 800*a*, 800*b*, and 800*c* for the TDD hopping superframe 500 includes the anchor segment 502 residing on the AHF and a respective data segment 504*a*, 504*b*, and 504*c* residing on the NHF. In the example shown in FIG. 8, the anchor segment 502 may have a duration of 20 ms, corresponding to 20 subframes. Each data segment 504*a*, 504*b*, and 504*c* may have a duration of 140 ms, corresponding to 140 subframes. Thus, the total duration of the TDD hopping superframe 500 may be 160 ms, corresponding to 160 subframes.

The data segment 504*a* in the first fixed frame structure 800*a* includes a downlink portion 802 (e.g., which may include the guaranteed downlink (DL) portion and a configured DL portion) and a guaranteed uplink (UL) portion 804. The data segment 504*b* in the second fixed frame structure 800*b* includes the guaranteed DL portion 806 and an uplink portion 808 (e.g., which may include a configured UL portion and the guaranteed uplink portion). The data segment 504*c* in the third fixed frame structure 800*c* includes the guaranteed DL portion 810, a configured UL portion 812, a configured DL portion 814 and the guaranteed UL portion 816. In the third fixed frame structure 800*c*, each of the configured DL and UL portions 812 and 814 has a duration of 38 ms, corresponding to 38 subframes. It should be understood that the examples shown in FIG. 8 are merely exemplary, and any fixed frame structure configured based on the configurable frame structure shown in FIG. 6 may be utilized.

Figure 9:
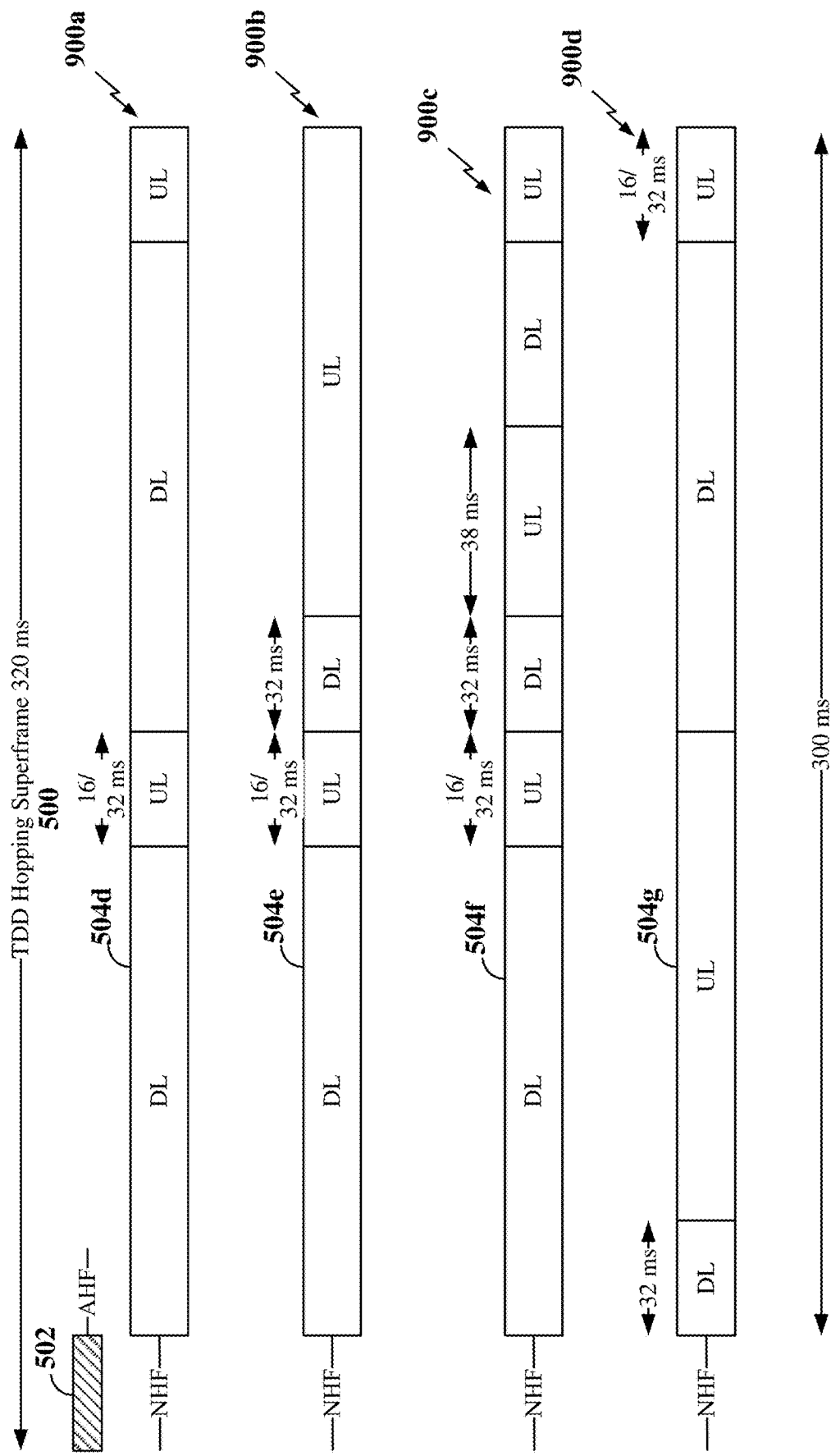
FIG. 9 illustrates further examples of configured TDD uplink hopping superframe structures.

FIG. 9 illustrates other examples of configured TDD uplink hopping superframe structures 900*a*, 900*b*, 900*c*, and 900*d* that may be preconfigured using the configurable frame structure shown in FIG. 7 and fixed in the network for one or more hopping superframes 500. Only one anchor hopping frequency (AHF) and one non-anchor hopping frequency (NHF) are shown, for simplicity, to illustrate communication within the hopping superframe 500 between a scheduling entity and a single scheduled entity (e.g., IoT device). The scheduling entity may correspond to the scheduling entity 300 shown in FIG. 3. The scheduled entity (e.g., IoT device operating as a UE) may correspond to the scheduled entity 400 shown in FIG. 4.

Each frame structure 900*a*, 900*b*, 900*c*, and 900*d* for the TDD hopping superframe 500 includes the anchor segment 502 residing on the AHF and a respective data segment 504*d*, 504*e*, 504*f*, and 504*g* residing on the NHF. In the example shown in FIG. 9, the anchor segment 502 may have a duration of 20 ms, corresponding to 20 subframes. Each data segment 504*d*, 504*e*, 504*f*, and 504*g* may have a duration of 300 ms, corresponding to 300 subframes. Thus, the total duration of the TDD hopping superframe 500 may be 320 ms, corresponding to 320 subframes.

The data segment 504*d* in the fixed frame structure 900*a* includes a downlink portion (e.g., which may include a guaranteed downlink (DL) portion and a configured DL portion), followed by a guaranteed uplink (UL) portion, followed by another downlink portion (e.g., which may include another guaranteed DL portion and another configured DL portion), followed by another guaranteed UL portion. The data segment 504*e* in the fixed frame structure 900*b* includes a DL portion (e.g., which may include a guaranteed DL portion and a configured DL portion), followed by a guaranteed UL portion, followed by a guaranteed DL portion, followed by an UL portion (e.g., which may include a configured UL portion and a guaranteed UL portion). The data segment 504*f* in the fixed frame structure 900*c* includes a downlink portion (e.g., which may include a guaranteed DL portion and a configured DL portion), followed by a guaranteed UL portion, followed by a guaranteed DL portion, followed by a configured UL portion and a configured DL portion, followed by a guaranteed UL portion. The data segment 504g in the fixed frame structure 900d includes a guaranteed DL portion, followed by an UL portion (e.g., which may include a configured UL portion and guaranteed UL portion) followed by a downlink portion (e.g., which may include a guaranteed DL portion and configured DL portion), followed by a guaranteed UL portion.

Figure 10:
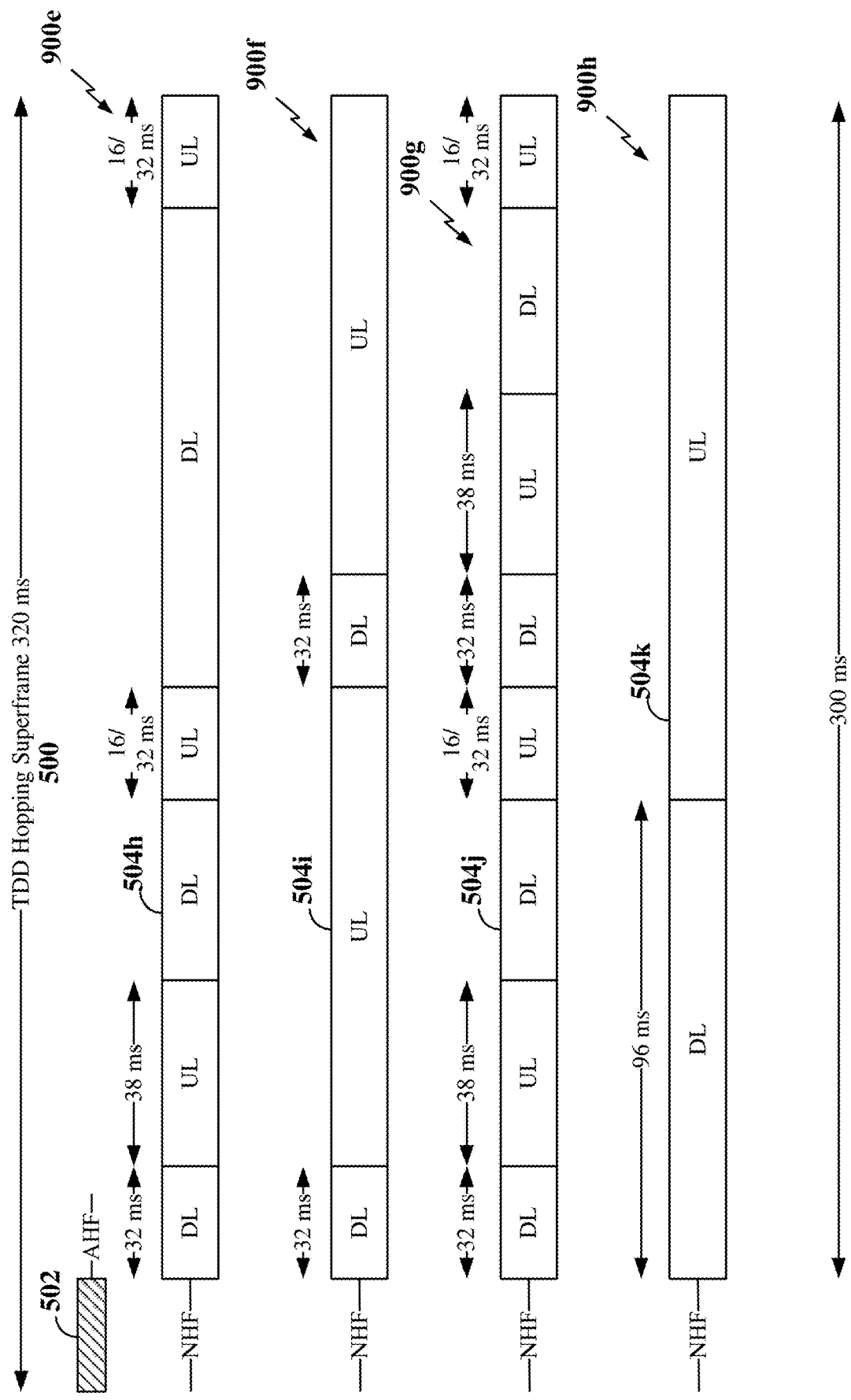
FIG. 10 illustrates further examples of configured TDD uplink hopping superframe structures.

FIG. 10 illustrates further examples of configured TDD uplink hopping superframe structures 900e, 900f, 900g, and 900h that may be preconfigured using the configurable frame structure shown in FIG. 7 and fixed in the network for one or more hopping superframes 500. Only one anchor hopping frequency (AHF) and one non-anchor hopping frequency (NHF) are shown, for simplicity, to illustrate communication within the hopping superframe 500 between a scheduling entity and a single scheduled entity (e.g., IoT device). The scheduling entity may correspond to the scheduling entity 300 shown in FIG. 3. The scheduled entity (e.g., IoT device operating as a UE) may correspond to the scheduled entity 400 shown in FIG. 4.

Each frame structure 900e, 900f, 900g, and 900h for the TDD hopping superframe 500 includes the anchor segment 502 residing on the AHF and a respective data segment 504h, 504i, 504j, and 504k residing on the NHF. In the example shown in FIG. 9, the anchor segment 502 may have a duration of 20 ms, corresponding to 20 subframes. Each data segment 504h, 504i, 504j, and 504k may have a duration of 300 ms, corresponding to 300 subframes. Thus, the total duration of the TDD hopping superframe 500 may be 320 ms, corresponding to 320 subframes.

The data segment 504h in the fixed frame structure 900e includes a guaranteed downlink (DL) portion, followed by a configured uplink (UL) portion, followed by a configured DL portion, followed by a guaranteed UL portion, followed by a DL portion (e.g., which may include a guaranteed downlink (DL) portion and a configured DL portion), followed by a guaranteed uplink (UL) portion. The data segment 504i in the fixed frame structure 900f includes a guaranteed DL portion, followed by an UL portion (e.g., which may include a configured UL portion and a guaranteed UL portion), followed by a guaranteed DL portion, followed by an UL portion (e.g., which may include a configured UL portion and a guaranteed UL portion). The data segment 504j in the fixed frame structure 900g includes a guaranteed DL portion, followed by a configured UL portion, followed by a configured DL portion, followed by a guaranteed UL portion, followed by a guaranteed DL portion, followed by a configured UL portion, followed by a configured DL portion, followed by a guaranteed UL portion. The data segment 504k in the fixed frame structure 900h includes a downlink portion (e.g., a guaranteed DL portion and a configured DL portion) followed by an uplink portion (e.g., a configured UL portion and a guaranteed UL portion).

Fixed frame structures 900f and 900h may support networks with stringent duty cycle constraints on downlink transmissions from the scheduling entity. Using an example of a frequency hopping system with three frequency hopping channels (e.g., three narrowband TDD carriers), the system will return to the same hopping channel after 960 ms (e.g., three hopping superframes, each having a 320 ms duration). Thus, over the 960 ms period (of which transmissions only occur in one 320 ms duration), with a 10% duty cycle, 96 ms of downlink transmissions may be allowed during the single hopping superframe that occurs during the 960 ms period. By aggregating the total duration of time from all of the hopping channels and calculating the duty cycle percentage from the total duration of time, the downlink transmission duration may be maximized during a hopping superframe. This example is illustrated in the fixed frame structure 900h, where the DL portion has a duration of 96 ms. The UL portion may be unused, or in the example of the EU band of 865.6 to 867.6 MHz, may include 2.5% of the total duration of 920 ms per UE (e.g., 23 ms of uplink transmissions for each UE).

It should be understood that the examples shown in FIGS. 9 and 10 are merely exemplary, and any fixed frame structure configured based on the configurable frame structure shown in FIG. 7 may be utilized.

Figure 11:
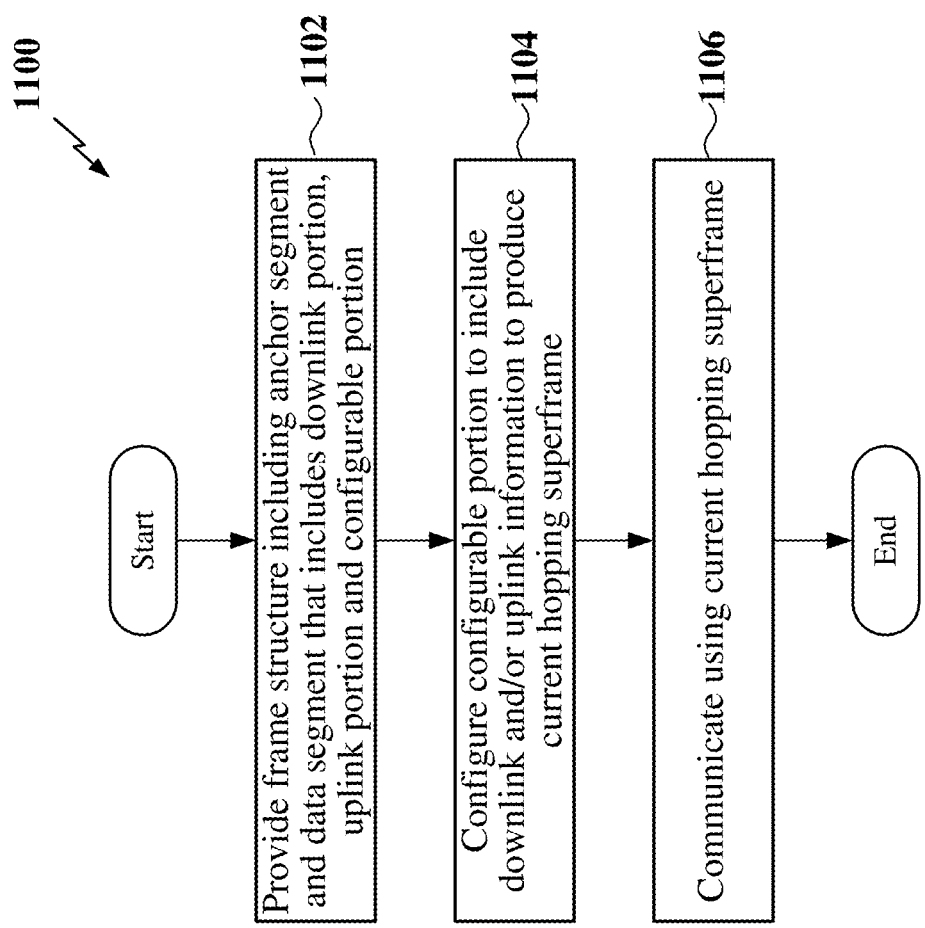
FIG. 11 is a flow chart illustrating an exemplary process for configuring a TDD hopping superframe.

FIG. 11 is a flow chart illustrating an exemplary process 1100 for configuring a time division duplexed (TDD) hopping superframe in accordance with some aspects of the present disclosure. As described below, some or all illustrated features may be omitted in a particular implementation within the scope of the present disclosure, and some illustrated features may not be required for implementation of all embodiments. In some examples, the process 1100 may be carried out by the scheduling entity 300 illustrated in FIG. 3. In some examples, the process 1100 may be carried out by any suitable apparatus or means for carrying out the functions or algorithm described below.

At block 1102, the scheduling entity may provide a frame structure utilizing a plurality of time division duplex (TDD) carriers, each corresponding to one of a plurality of hopping frequencies. The frame structure may include an anchor segment and a data segment. The anchor segment may reside on a plurality of anchor hopping frequencies, while the data segment may reside on at least one of a plurality of non-anchor hopping frequencies. The data segment may further include a downlink portion (e.g., a guaranteed downlink portion), an uplink portion (e.g., a guaranteed uplink portion), and a configurable portion between the downlink portion and the uplink portion that may include downlink information and/or uplink information. The anchor segment may include a plurality of downlink synchronization signals, each residing on a respective one of the plurality of anchor hopping frequencies. For example, the superframe structure configuration circuitry 341 shown and described above in connection with FIG. 3 may provide the frame structure.

At block 1104, the scheduling entity may configure at least the configurable portion of the data segment to include at least one of downlink information or uplink information to produce a current hopping superframe of a plurality of hopping superframes. In some examples, the scheduling entity may dynamically configure the current hopping superframe. In other examples, the scheduling entity may utilize a preconfigured (fixed) structure for at least the configurable portion current hopping superframe. In this example, the scheduling entity may transmit the fixed frame structure via RRC signaling. In some examples, the scheduling entity may further configure the guaranteed uplink portion to include either NPUCCH, Format 1 or Format 2. For example, the superframe structure configuration circuitry 341 shown and described above in connection with FIG. 3 may configure the frame structure to produce the current hopping superframe.

At block 1106, the scheduling entity may communicate with a set of one or more scheduled entities using the current hopping superframe. For example, the DL traffic and control channel generation and transmission circuitry 343 and the UL traffic and control channel reception and processing circuitry 344 shown and described above in connection with FIG. 3 may communicate using the current hopping superframe.

Figure 12:
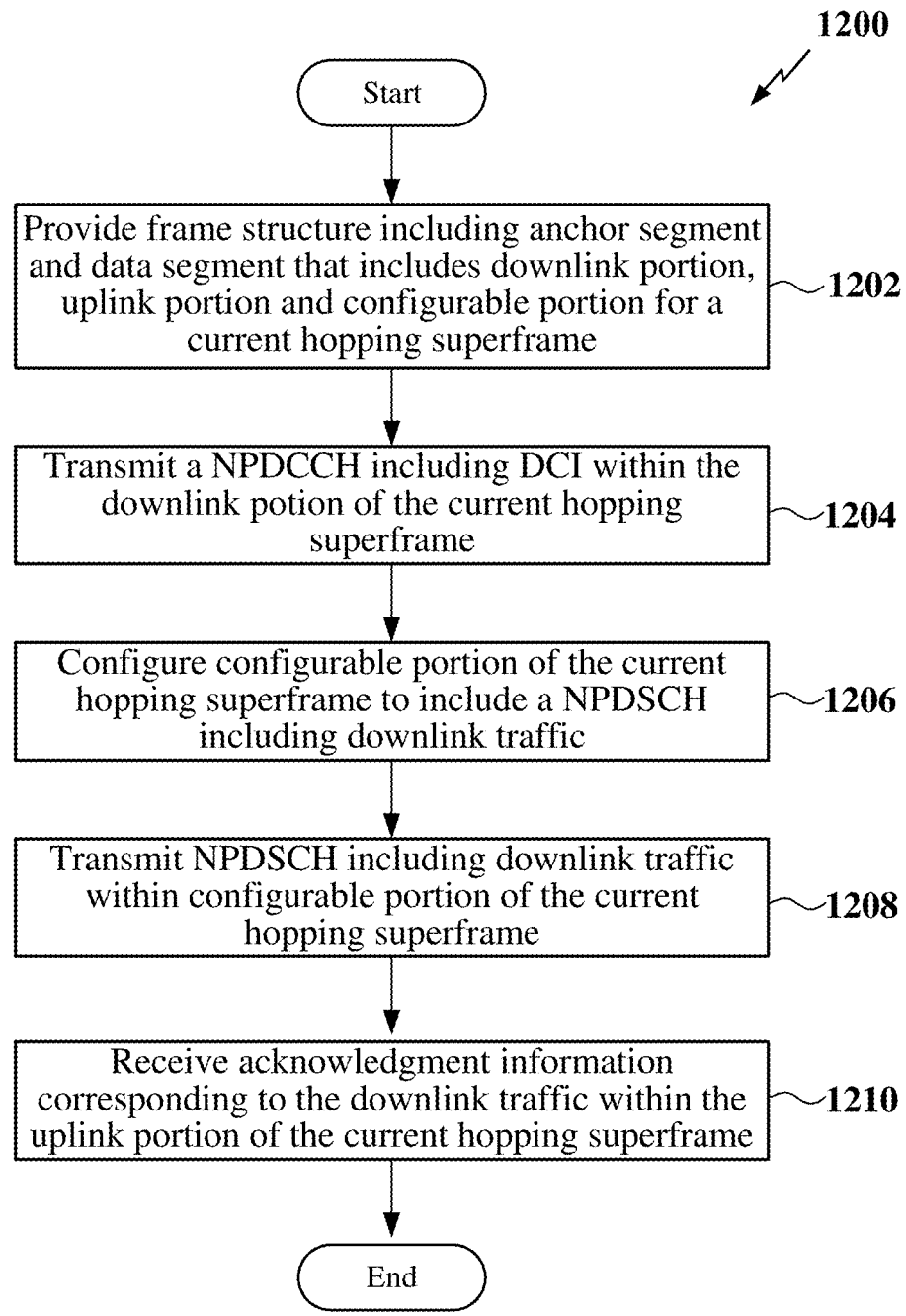
FIG. 12 is a flow chart illustrating another exemplary process for configuring a TDD hopping superframe.

FIG. 12 is a flow chart illustrating an exemplary process 1200 for configuring a time division duplexed (TDD) hopping superframe in accordance with some aspects of the present disclosure. As described below, some or all illustrated features may be omitted in a particular implementation within the scope of the present disclosure, and some illustrated features may not be required for implementation of all embodiments. In some examples, the process 1200 may be carried out by the scheduling entity 300 illustrated in FIG. 3. In some examples, the process 1200 may be carried out by any suitable apparatus or means for carrying out the functions or algorithm described below.

At block 1202, the scheduling entity may provide a frame structure for a current hopping superframe utilizing a plurality of time division duplex (TDD) carriers, each corresponding to one of a plurality of hopping frequencies. The frame structure may include an anchor segment and a data segment. The anchor segment may reside on a plurality of anchor hopping frequencies, while the data segment may reside on at least one of a plurality of non-anchor hopping frequencies. The data segment may further include a downlink portion (e.g., a guaranteed downlink portion), an uplink portion (e.g., a guaranteed uplink portion), and a configurable portion between the downlink portion and the uplink portion that may include downlink information and/or uplink information. For example, the superframe structure configuration circuitry 341 shown and described above in connection with FIG. 3 may provide the frame structure.

At block 1204, the scheduling entity may transmit a narrowband physical downlink control channel (NPDCCH) including downlink control information for at least one scheduled entity of a set of scheduling entities within the downlink portion of the current hopping superframe. In some examples, the DCI may include frame structure information indicating the configurable portion of the current hopping superframe includes downlink information. For example, the superframe structure configuration circuitry 341 and DL traffic and control channel generation and transmission circuitry 343, together with the transceiver 310, shown and described above in connection with FIG. 3 may transmit the NPDCCH within the downlink portion of the current hopping superframe.

At block 1206, the scheduling entity may configure the configurable portion of the data segment of the current hopping superframe to include a narrowband physical downlink shared channel (NPDSCH) for communicating downlink traffic. In some examples, the scheduling entity may dynamically configure the current hopping superframe. In other examples, the scheduling entity may utilize a preconfigured (fixed) structure for at least the configurable portion current hopping superframe. In this example, the scheduling entity may transmit the fixed frame structure via RRC signaling. In some examples, the scheduling entity may further configure the guaranteed uplink portion to include either NPUCCH, Format 1 or Format 2. For example, the superframe structure configuration circuitry 341 shown and described above in connection with FIG. 3 may configure the configurable portion of the current hopping superframe.

At block 1208, the scheduling entity may transmit the NPDSCH including downlink traffic to at least the scheduled entity of the set of one or more scheduled entities within the configurable portion of the current hopping superframe. For example, the DL traffic and control channel generation and transmission circuitry 343, together with the transceiver 310, shown and described above in connection with FIG. 3 may transmit the PDSCH including downlink traffic.

At block 1210, the scheduling entity may receive acknowledgment information corresponding to the downlink traffic (e.g., an ACK/NACK for the downlink traffic) from the at least one scheduled entity within the uplink portion of the current hopping superframe. For example, the UL traffic and control channel reception and processing circuitry 344, together with the transceiver 310, shown and described above in connection with FIG. 3 may receive the acknowledgment information within the uplink portion of the current hopping superframe.

Figure 13:
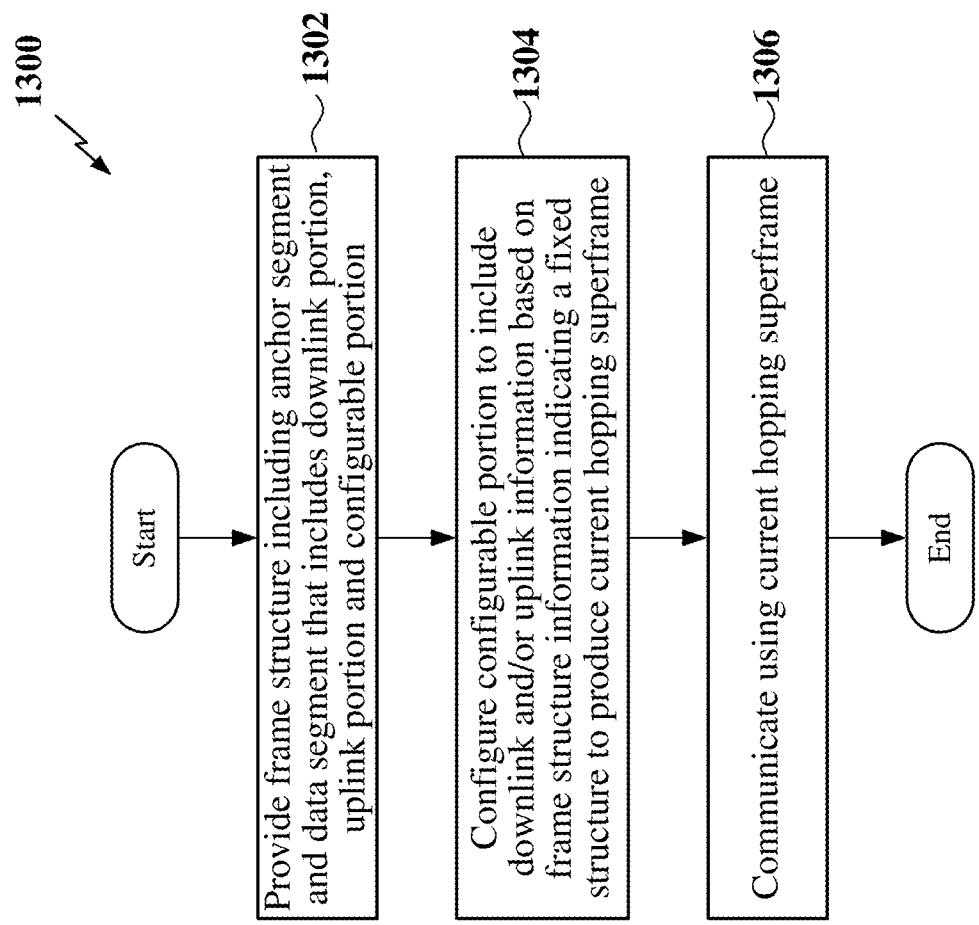
FIG. 13 is a flow chart illustrating another exemplary process for configuring a TDD hopping superframe.

FIG. 13 is a flow chart illustrating an exemplary process 1300 for configuring a time division duplexed (TDD) hopping superframe in accordance with some aspects of the present disclosure. As described below, some or all illustrated features may be omitted in a particular implementation within the scope of the present disclosure, and some illustrated features may not be required for implementation of all embodiments. In some examples, the process 1300 may be carried out by the scheduling entity 300 illustrated in FIG. 3. In some examples, the process 1300 may be carried out by any suitable apparatus or means for carrying out the functions or algorithm described below.

At block 1302, the scheduling entity may provide a frame structure utilizing a plurality of time division duplex (TDD) carriers, each corresponding to one of a plurality of hopping frequencies. The frame structure may include an anchor segment and a data segment. The anchor segment may reside on a plurality of anchor hopping frequencies, while the data segment may reside on at least one of a plurality of non-anchor hopping frequencies. The data segment may further include a downlink portion (e.g., a guaranteed downlink portion), an uplink portion (e.g., a guaranteed uplink portion), and a configurable portion between the downlink portion and the uplink portion that may include downlink information and/or uplink information. For example, the superframe structure configuration circuitry 341 shown and described above in connection with FIG. 3 may provide the frame structure.

At block 1304, the scheduling entity may configure at least the configurable portion of the data segment to include at least one of downlink information or uplink information to produce a current hopping superframe of a plurality of hopping superframes. The scheduling entity may configure the configurable portion based on frame structure information indicating a preconfigured (fixed) frame structure for the configurable portion in the network. In some examples, the scheduling entity may communicate the fixed frame structure via radio resource control (RRC) signaling. For example, the superframe structure configuration circuitry 341 shown and described above in connection with FIG. 3 may configure the frame structure to produce the current hopping superframe.

At block 1306, the scheduling entity may communicate with a set of one or more scheduled entities using the current hopping superframe. For example, the DL traffic and control channel generation and transmission circuitry 343 and the UL traffic and control channel reception and processing circuitry 344 shown and described above in connection with FIG. 3 may communicate using the current hopping superframe.

Figure 14:
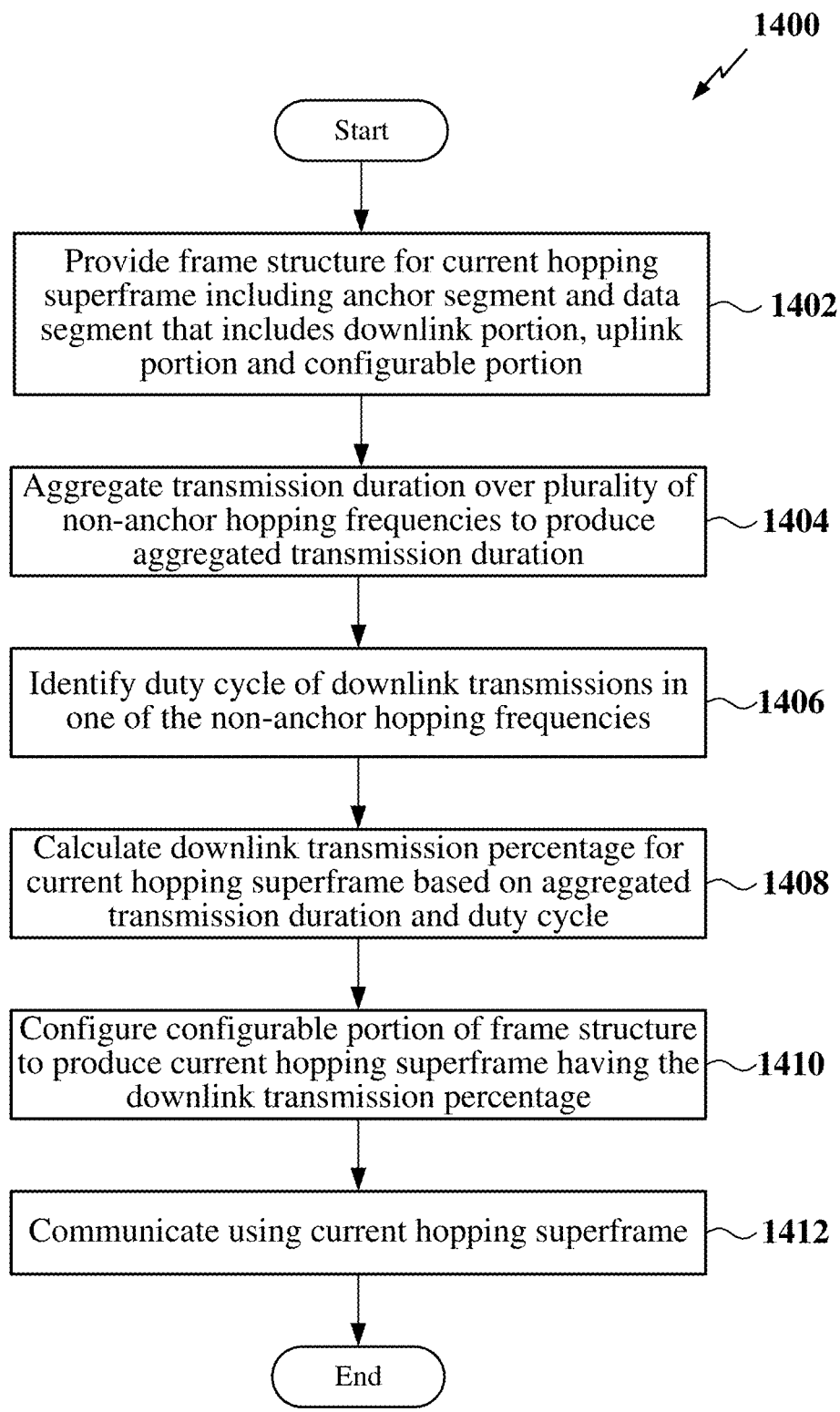
FIG. 14 is a flow chart illustrating another exemplary process for configuring a TDD hopping superframe.

FIG. 14 is a flow chart illustrating an exemplary process 1400 for configuring a time division duplexed (TDD) hopping superframe in accordance with some aspects of the present disclosure. As described below, some or all illustrated features may be omitted in a particular implementation within the scope of the present disclosure, and some illustrated features may not be required for implementation of all embodiments. In some examples, the process 1400 may be carried out by the scheduling entity 300 illustrated in FIG. 3. In some examples, the process 1400 may be carried out by any suitable apparatus or means for carrying out the functions or algorithm described below.

At block 1402, the scheduling entity may provide a frame structure for a current hopping superframe utilizing a plurality of time division duplex (TDD) carriers, each corresponding to one of a plurality of hopping frequencies. The frame structure may include an anchor segment and a data segment. The anchor segment may reside on a plurality of anchor hopping frequencies, while the data segment may reside on at least one of a plurality of non-anchor hopping frequencies. The data segment may further include a downlink portion (e.g., a guaranteed downlink portion), an uplink portion (e.g., a guaranteed uplink portion), and a configurable portion between the downlink portion and the uplink portion that may include downlink information and/or uplink information. For example, the superframe structure configuration circuitry 341 shown and described above in connection with FIG. 3 may provide the frame structure.

At block 1404, the scheduling entity may aggregate a transmission duration of the current hopping superframe over a plurality of non-anchor hopping frequencies to produce an aggregated transmission duration. For example, the superframe structure configuration circuitry 341 shown and described above in connection with FIG. 3 may determine the aggregated transmission duration.

At block 1406, the scheduling entity may identify a duty cycle of downlink transmissions in one of the non-anchor hopping frequencies. For example, the superframe structure configuration circuitry 341 shown and described above in connection with FIG. 3 may identify the duty cycle.

At block 1408, the scheduling entity may calculate a downlink transmission percentage for the current hopping superframe based on the aggregated transmission duration and the duty cycle. For example, the superframe structure configuration circuitry 341 shown and described above in connection with FIG. 3 may calculate the downlink transmission percentage.

At block 1410, the scheduling entity may configure the configurable portion of the frame structure to produce the current hopping superframe having the downlink transmission percentage (e.g., the guaranteed downlink portion in combination with the configured downlink portion equals the allowed downlink transmission percentage). For example, the superframe structure configuration circuitry 341 shown and described above in connection with FIG. 3 may configure the frame structure to produce the current hopping superframe.

At block 1410, the scheduling entity may communicate with a set of one or more scheduled entities using the current hopping superframe. For example, the DL traffic and control channel generation and transmission circuitry 343 and the UL traffic and control channel reception and processing circuitry 344 shown and described above in connection with FIG. 3 may communicate using the current hopping superframe.

Figure 15:
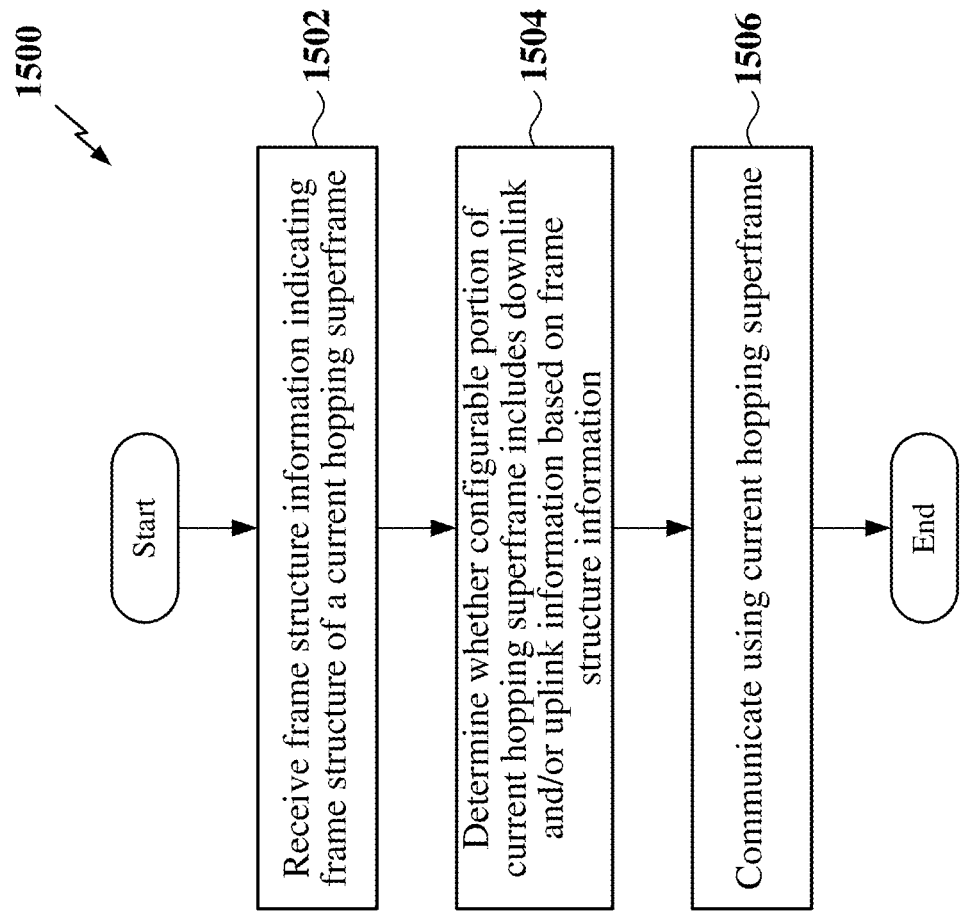
FIG. 15 is a flow chart illustrating an exemplary process for determining a configuration of a TDD hopping superframe.

FIG. 15 is a flow chart illustrating an exemplary process 1500 for configuring a time division duplexed (TDD) hopping superframe in accordance with some aspects of the present disclosure. As described below, some or all illustrated features may be omitted in a particular implementation within the scope of the present disclosure, and some illustrated features may not be required for implementation of all embodiments. In some examples, the process 1500 may be carried out by the scheduled entity 400 illustrated in FIG. 4. In some examples, the process 1500 may be carried out by any suitable apparatus or means for carrying out the functions or algorithm described below.

At block 1502, the scheduled entity may receive frame structure information indicating a frame structure of a current hopping superframe. The frame structure may include an anchor segment and a data segment. The anchor segment may reside on a plurality of anchor hopping frequencies, while the data segment may reside on at least one of a plurality of non-anchor hopping frequencies. Each of the anchor hopping frequencies and the non-anchor hopping frequencies may correspond to one of a plurality of time division duplex (TDD) carriers. The data segment may further include a downlink portion (e.g., a guaranteed downlink portion), an uplink portion (e.g., a guaranteed uplink portion), and a configurable portion between the downlink portion and the uplink portion that may include downlink information and/or uplink information. In some examples, the frame structure information may be received within the downlink control information of the current hopping superframe. In other examples, the frame structure information may be received within a control message or via RRC signaling prior to receipt of the current hopping superframe. For example, the superframe structure configuration circuitry 441 shown and described above in connection with FIG. 4 may receive the frame structure information.

At block 1504, the scheduled entity may determine at least whether the configurable portion of the data segment of the current hopping superframe includes downlink information and/or uplink information based on the frame structure information. In some examples, the scheduled entity may further determine whether the guaranteed uplink portion includes either NPUCCH, Format 1 or Format 2, based on the frame structure information. For example, the superframe structure configuration circuitry 441 shown and described above in connection with FIG. 4 may determine the configuration for the current hopping superframe utilizing the frame structure information.

At block 1506, the scheduled entity may communicate with a scheduling entity using the current hopping superframe. For example, the UL traffic and control channel generation and transmission circuitry 442 and the DL traffic and control channel reception and processing circuitry 443 shown and described above in connection with FIG. 4 may communicate using the current hopping superframe.

Figure 16:
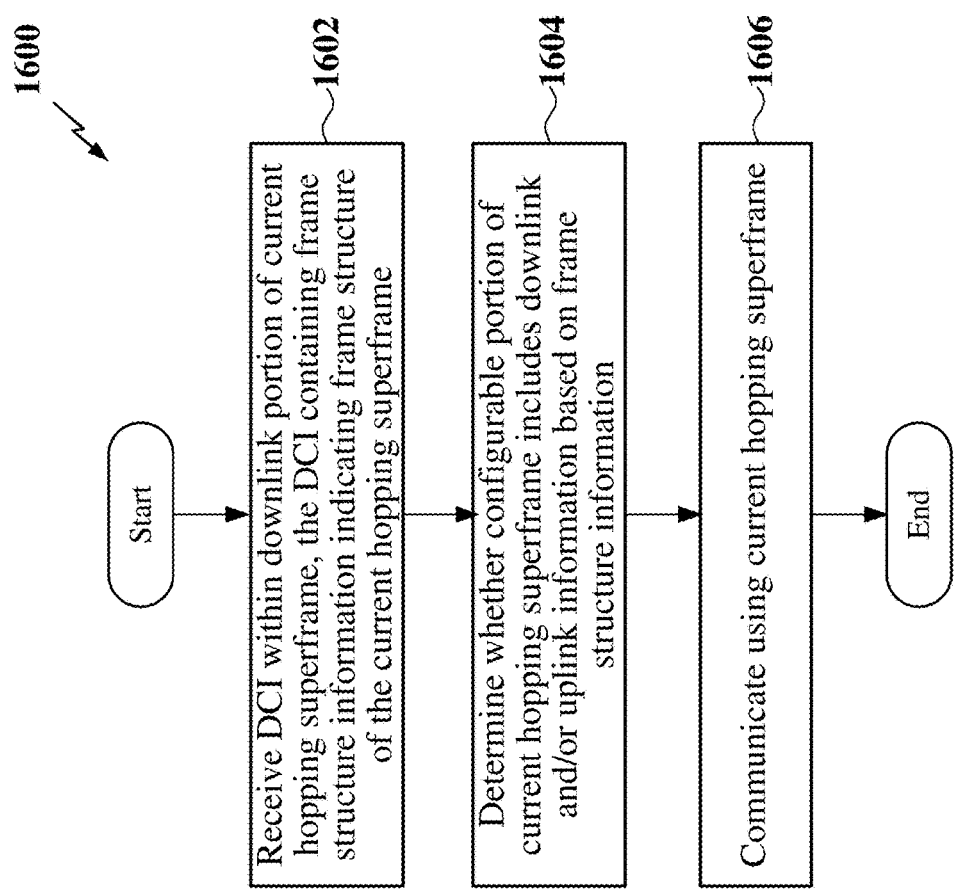
FIG. 16 is a flow chart illustrating another exemplary process for determining a configuration of a TDD hopping superframe.

FIG. 16 is a flow chart illustrating an exemplary process 1600 for configuring a time division duplexed (TDD) hopping superframe in accordance with some aspects of the present disclosure. As described below, some or all illustrated features may be omitted in a particular implementation within the scope of the present disclosure, and some illustrated features may not be required for implementation of all embodiments. In some examples, the process 1600 may be carried out by the scheduled entity 400 illustrated in FIG. 4. In some examples, the process 1600 may be carried out by any suitable apparatus or means for carrying out the functions or algorithm described below.

At block 1602, the scheduled entity may receive downlink control information (DCI) within a downlink portion of a current hopping superframe. The DCI may include frame structure information indicating a frame structure of the current hopping superframe. The frame structure may include an anchor segment and a data segment. The anchor segment may reside on a plurality of anchor hopping frequencies, while the data segment may reside on at least one of a plurality of non-anchor hopping frequencies. Each of the anchor hopping frequencies and the non-anchor hopping frequencies may correspond to one of a plurality of time division duplex (TDD) carriers. The data segment may further include a downlink portion (e.g., a guaranteed downlink portion), an uplink portion (e.g., a guaranteed uplink portion), and a configurable portion between the downlink portion and the uplink portion that may include downlink information and/or uplink information. For example, the superframe structure configuration circuitry 441 shown and described above in connection with FIG. 4 may receive the frame structure information.

At block 1604, the scheduled entity may determine at least whether the configurable portion of the data segment of the current hopping superframe includes downlink information and/or uplink information based on the frame structure information. In some examples, the scheduled entity may further determine whether the guaranteed uplink portion includes either NPUCCH, Format 1 or Format 2, based on the frame structure information. For example, the superframe structure configuration circuitry 441 shown and described above in connection with FIG. 4 may determine the configuration for the current hopping superframe utilizing the frame structure information.

At block 1606, the scheduled entity may communicate with a scheduling entity using the current hopping superframe. For example, the UL traffic and control channel generation and transmission circuitry 442 and the DL traffic and control channel reception and processing circuitry 443 shown and described above in connection with FIG. 4 may communicate using the current hopping superframe.

Figure 17:
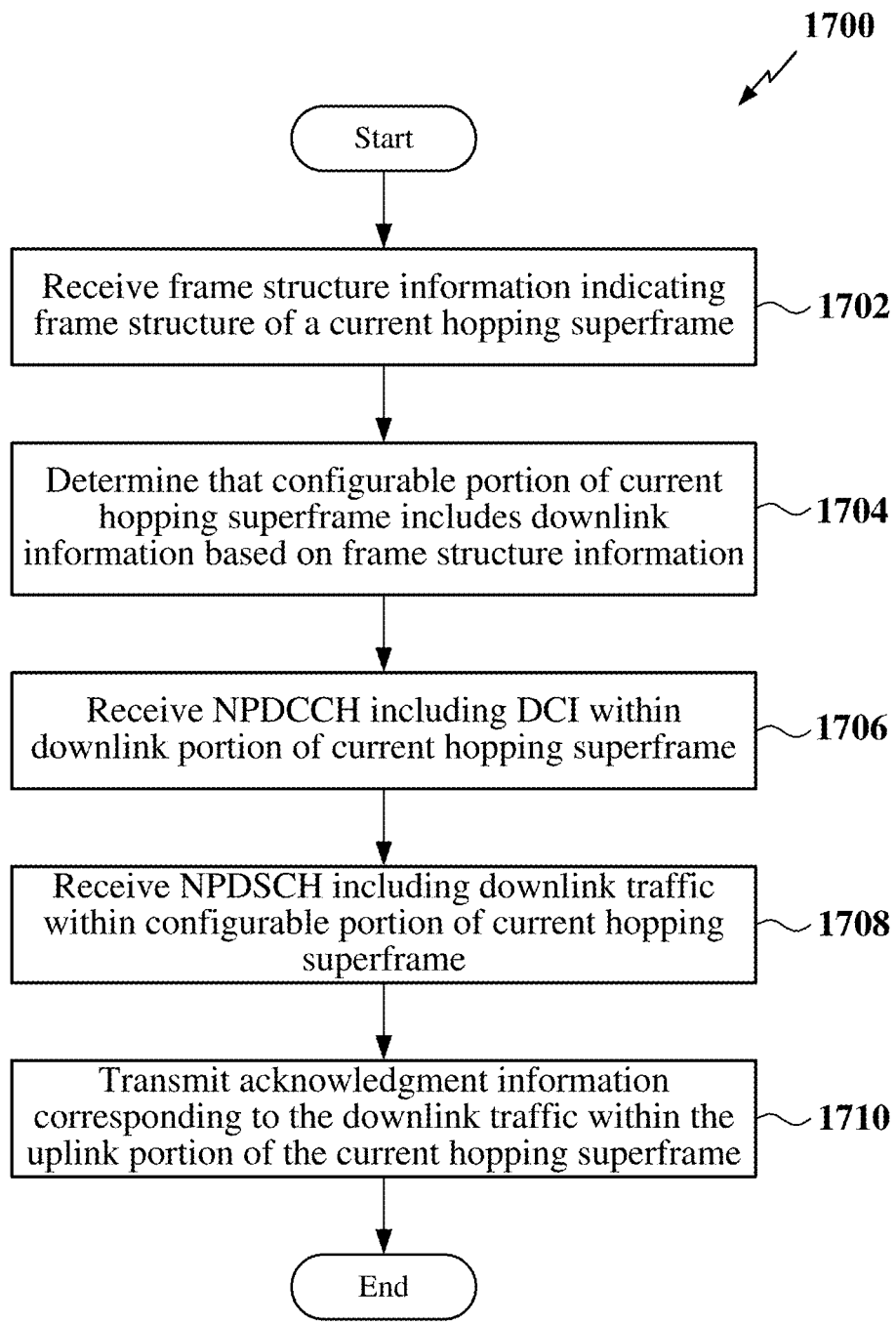
FIG. 17 is a flow chart illustrating another exemplary process for determining a configuration of a TDD hopping superframe.

FIG. 17 is a flow chart illustrating an exemplary process 1700 for configuring a time division duplexed (TDD) hopping superframe in accordance with some aspects of the present disclosure. As described below, some or all illustrated features may be omitted in a particular implementation within the scope of the present disclosure, and some illustrated features may not be required for implementation of all embodiments. In some examples, the process 1700 may be carried out by the scheduled entity 400 illustrated in FIG. 4. In some examples, the process 1700 may be carried out by any suitable apparatus or means for carrying out the functions or algorithm described below.

At block 1702, the scheduled entity may receive frame structure information indicating a frame structure of a current hopping superframe. The frame structure may include an anchor segment and a data segment. The anchor segment may reside on a plurality of anchor hopping frequencies, while the data segment may reside on at least one of a plurality of non-anchor hopping frequencies. Each of the anchor hopping frequencies and the non-anchor hopping frequencies may correspond to one of a plurality of time division duplex (TDD) carriers. The data segment may further include a downlink portion (e.g., a guaranteed downlink portion), an uplink portion (e.g., a guaranteed uplink portion), and a configurable portion between the downlink portion and the uplink portion that may include downlink information and/or uplink information. In some examples, the frame structure information may be received within the downlink control information of the current hopping superframe. In other examples, the frame structure information may be received within a control message or via RRC signaling prior to receipt of the current hopping superframe. For example, the superframe structure configuration circuitry 441 shown and described above in connection with FIG. 4 may receive the frame structure information.

At block 1704, the scheduled entity may determine that the configurable portion of the data segment of the current hopping superframe includes downlink information based on the frame structure information. In some examples, the scheduled entity may further determine whether the guaranteed uplink portion includes either NPUCCH, Format 1 or Format 2, based on the frame structure information. For example, the superframe structure configuration circuitry 441 shown and described above in connection with FIG. 4 may determine the configuration for the current hopping superframe utilizing the frame structure information.

At block 1706, the scheduled entity may receive a narrowband physical downlink control channel (NPDCCH) including downlink control information (DCI) for at least the scheduled entity within the downlink portion of the current hopping superframe. In some examples, the DCI further includes the frame structure information indicating that the current hopping superframe includes downlink information in the configurable portion thereof. In this example, blocks 1702 and 1704 may be implemented after block 1706. For example, the DL traffic and control channel reception and processing circuitry 443 shown and described above in connection with FIG. 4 may receive the NPDCCH.

At block 1708, the scheduled entity may receive a narrowband physical downlink shared channel (NPDSCH) including downlink traffic in the configurable portion of the current hopping superframe. For example, the DL traffic and control channel reception and processing circuitry 443 shown and described above in connection with FIG. 4 may receive the NPDCCH.

At block 1710, the scheduled entity may generate and transmit acknowledgment information corresponding to the received downlink traffic (e.g., an ACK/NACK of the downlink traffic) within the uplink portion of the current hopping superframe. For example, the UL traffic and control channel generation and transmission circuitry 442 shown and described above in connection with FIG. 4 may receive the NPDCCH.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-17 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-4 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication in a wireless communication network for a scheduling entity to communicate with a set of one or more scheduled entities, the method comprising:
   providing a frame structure comprising a plurality of time division duplex (TDD) carriers, each of the plurality of TDD carriers corresponding to one of a plurality of hopping frequencies, the plurality of hopping frequencies comprising a plurality of anchor hopping frequencies and a plurality of non-anchor hopping frequencies, wherein the frame structure comprises an anchor segment residing on the plurality of anchor hopping frequencies and a data segment residing on at least one of the plurality of non-anchor hopping frequencies, wherein the data segment comprises a guaranteed downlink portion, a guaranteed uplink portion, and a configurable portion between the downlink portion and the uplink portion that is dynamically configurable;
   configuring the configurable portion of the frame structure to comprise at least one of downlink information or uplink information to produce a current hopping superframe of a plurality of hopping superframes; and
   communicating between the scheduling entity and the set of one or more scheduled entities using the current hopping superframe.

2. The method of claim 1, further comprising:
   transmitting a plurality of downlink synchronization signals in the anchor segment, each of the plurality of downlink synchronization signals residing on a respective one of the plurality of anchor hopping frequencies.

3. The method of claim 1, further comprising:
   transmitting a narrowband physical downlink control channel comprising downlink control information (DCI) for at least one scheduled entity of the set of one or more scheduled entities within the guaranteed downlink portion of the current hopping superframe over an air interface;
   configuring the configurable portion of the current hopping superframe to comprise a narrowband physical downlink shared channel comprising downlink traffic; and
   transmitting the narrowband physical downlink shared channel comprising the downlink traffic within the configurable portion of the current hopping superframe to the at least one scheduled entity of the set of one or more scheduled entities over the air interface.

4. The method of claim 3, further comprising:
   receiving acknowledgement information corresponding to the downlink traffic from the at least one scheduled entity within the guaranteed uplink portion of the current hopping superframe.

5. The method of claim 1, further comprising:
   transmitting a physical downlink control channel comprising downlink control information (DCI) within the guaranteed downlink portion of the current hopping superframe over an air interface, the DCI comprising frame structure information indicating the configurable portion of the current hopping superframe comprises downlink information or uplink information.

6. The method of claim 1, wherein the frame structure comprises at least two downlink portions, at least two uplink portions, and at least two configurable portions.

7. The method of claim 1, wherein the frame structure comprises 160 ms or 320 ms.

8. The method of claim 7, wherein:
the anchor segment comprises at least 10 ms;
the downlink portion comprises at least 32 ms; and
the uplink portion comprises at least 16 ms.

9. The method of claim 1, wherein each of the plurality of TDD carriers comprises a bandwidth of 200 kHz.

10. The method of claim 1, wherein configuring the configurable portion of the frame structure to produce the current hopping superframe further comprises:
configuring the configurable portion of the frame structure based on frame structure information associated with a number of the plurality of hopping superframes in the wireless communication network.

11. The method of claim 1, further comprising:
aggregating a transmission duration of the current hopping superframe over the plurality of non-anchor hopping frequencies to produce an aggregated transmission duration;
identifying a duty cycle associated with downlink transmissions in one of the non-anchor hopping frequencies;
calculating a downlink transmission percentage for the current hopping superframe based on the aggregated transmission duration and the duty cycle; and
configuring the configurable portion of the frame structure to produce the current hopping superframe comprising the downlink transmission percentage.

12. A scheduling entity in a wireless communication network, comprising:
a processor;
a transceiver communicatively coupled to the processor and configured to wirelessly communicate with a set of one or more scheduled entities over a plurality of time division duplex (TDD) carriers, each of the plurality of TDD carriers corresponding to one of a plurality of hopping frequencies, the plurality of hopping frequencies comprising a plurality of anchor hopping frequencies and a plurality of non-anchor hopping frequencies; and
a memory communicatively coupled to the processor and maintaining a frame structure, wherein the frame structure comprises an anchor segment configured to reside on the plurality of anchor hopping frequencies and a data segment configured to reside on at least one of the plurality of non-anchor hopping frequencies, wherein the data segment comprises a guaranteed downlink portion, a guaranteed uplink portion, and a configurable portion between the downlink portion and the uplink portion that is dynamically configurable;
wherein the processor is configured to:
configure the configurable portion of the frame structure to comprise at least one of downlink information or uplink information to produce a current hopping superframe of a plurality of hopping superframes; and
communicate with the set of one or more scheduled entities using the current hopping superframe via the transceiver.

13. The scheduling entity of claim 12, wherein the frame structure comprises at least two downlink portions, at least two uplink portions, and at least two configurable portions.

14. The scheduling entity of claim 12, wherein:
the frame structure comprises 160 ms or 320 ms;
the anchor segment comprises at least 10 ms;
the downlink portion comprises at least 32 ms; and the uplink portion comprises at least 16 ms.

15. The scheduling entity of claim 12, wherein the processor is further configured to:
aggregate a transmission duration of the current hopping superframe over the plurality of non-anchor hopping frequencies to produce an aggregated transmission duration;
identify a duty cycle associated with downlink transmissions in one of the non-anchor hopping frequencies;
calculate a downlink transmission percentage for the current hopping superframe based on the aggregated transmission duration and the duty cycle; and
configure the configurable portion of the frame structure to produce the current hopping superframe comprising the downlink transmission percentage.

16. A method of wireless communication in a wireless communication network for a scheduled entity to communicate with a scheduling entity, the method comprising:
receiving frame structure information indicating a frame structure of a current hopping superframe, wherein the frame structure comprises an anchor segment residing on a plurality of anchor hopping frequencies and a data segment residing on one of a plurality of non-anchor hopping frequencies, wherein each of the anchor hopping frequencies and the non-anchor hopping frequencies corresponds to one of a plurality of time division duplex (TDD) carriers, wherein the data segment comprises a guaranteed downlink portion, a guaranteed uplink portion, and a configurable portion between the downlink portion and the uplink portion that is dynamically configurable;
determining whether the configurable portion of the frame structure for the current hopping superframe comprises at least one of downlink information or uplink information based on the frame structure information; and
communicating between the scheduled entity and the scheduling entity using the current hopping superframe.

17. The method of claim 16, wherein receiving the frame structure information further comprises:
receiving the frame structure information associated with a number of a plurality of hopping superframes including the current hopping superframe.

18. The method of claim 17, wherein receiving the frame structure information further comprises:
receiving the frame structure information associated with a number of the plurality of hopping superframes including the current hopping superframe via radio resource control (RRC) signaling.

19. The method of claim 16, wherein the anchor segment comprises a plurality of downlink synchronization signals, each residing on a respective one of the plurality of anchor hopping frequencies, and further comprising:
receiving one of the plurality of downlink synchronization signals on one of the plurality of anchor hopping frequencies.

20. The method of claim 16, wherein communicating between the scheduled entity and the scheduling entity using the current hopping superframe further comprises:
receiving a narrowband physical downlink control channel comprising downlink control information (DCI) for at least the scheduled entity within the guaranteed downlink portion of the current hopping superframe; and
receiving a narrowband physical downlink shared channel comprising downlink traffic within the configurable portion of the current hopping superframe.

21. The method of claim 20, wherein communicating between the scheduled entity and the scheduling entity using the current hopping superframe further comprises:
transmitting acknowledgement information corresponding to the downlink traffic within the guaranteed uplink portion of the current hopping superframe.

22. The method of claim 16, wherein the frame structure comprises at least two downlink portions, at least two uplink portions, and at least two configurable portions.

23. The method of claim 16, wherein the frame structure comprises 160 ms or 320 ms.

24. The method of claim 22, wherein:
the anchor segment comprises at least 10 ms;
the downlink portion comprises at least 32 ms; and
the uplink portion comprises at least 16 ms.

25. The method of claim 16, wherein each of the plurality of TDD carriers comprises a bandwidth of 200 kHz.

26. A scheduled entity in a wireless communication network, comprising:
a processor;
a transceiver communicatively coupled to the processor and configured to wirelessly communicate with a scheduling entity over a plurality of time division duplex (TDD) carriers, each of the plurality of TDD carriers corresponding to one of a plurality of hopping frequencies; and
a memory communicatively coupled to the processor;
wherein the processor is configured to:
receive frame structure information indicating a frame structure of a current hopping superframe, wherein the frame structure comprises an anchor segment residing on a plurality of anchor hopping frequencies and a data segment residing on one of a plurality of non-anchor hopping frequencies, wherein the data segment comprises a guaranteed downlink portion, a guaranteed uplink portion, and a configurable portion between the downlink portion and the uplink portion that is dynamically configurable;
determine whether the configurable portion of the frame structure for the current hopping superframe comprises at least one of downlink information or uplink information based on the frame structure information; and
communicate between the scheduled entity and the scheduling entity using the current hopping superframe.

27. The scheduled entity of claim 26, wherein the processor is further configured to:
receive the frame structure information associated with a number of the plurality of hopping superframes including the current hopping superframe.

28. The scheduled entity of claim 26, wherein the processor is further configured to:
receive the frame structure information associated with a number of the plurality of hopping superframes including the current hopping superframe via radio resource control (RRC) signaling.

29. The scheduled entity of claim 26, wherein the frame structure comprises at least two downlink portions, at least two uplink portions, and at least two configurable portions.

30. The scheduled entity of claim 26, wherein:
the frame structure comprises 160 ms or 320 ms;
the anchor segment comprises at least 10 ms;
the downlink portion comprises at least 32 ms; and
the uplink portion comprises at least 16 ms.

* * * * *